(12) United States Patent
Kang et al.

(10) Patent No.: US 11,493,956 B2
(45) Date of Patent: Nov. 8, 2022

(54) ELECTRONIC DEVICE INCLUDING ELECTRONIC COMPONENT ARRANGEMENT STRUCTURE

(71) Applicant: Samsung Electronics Co., Ltd., Gyeonggi-do (KR)

(72) Inventors: Youngmin Kang, Gyeonggi-do (KR); Sanghyuk Park, Gyeonggi-do (KR); Moonchul Shin, Gyeonggi-do (KR); Sungho Ahn, Gyeonggi-do (KR); Seungjoon Lee, Gyeonggi-do (KR); Hojin Jung, Gyeonggi-do (KR); Yangwook Kim, Gyeonggi-do (KR); Byounguk Yoon, Gyeonggi-do (KR); Hyunju Hong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/363,236

(22) Filed: Jun. 30, 2021

(65) Prior Publication Data

US 2022/0019260 A1    Jan. 20, 2022

(30) Foreign Application Priority Data

Jul. 14, 2020 (KR) .......................... 10-2020-0086823
Oct. 7, 2020 (KR) .......................... 10-2020-0129528

(Continued)

(51) Int. Cl.
*G06F 1/16* (2006.01)
*H01Q 1/24* (2006.01)

(52) U.S. Cl.
CPC .......... *G06F 1/1624* (2013.01); *G06F 1/1652* (2013.01); *G06F 1/1656* (2013.01); *H01Q 1/243* (2013.01)

(58) Field of Classification Search
CPC ......... G06F 1/1652; G06F 2203/04803; G09F 9/301; H04M 1/0268
See application file for complete search history.

(56) References Cited

U.S. PATENT DOCUMENTS 6,771,232 B2 * 8/2004 Fujieda ................. G06F 1/1656
                                                              345/55
7,667,962 B2 * 2/2010 Mullen ................. G06F 1/1605
                                                              359/461

(Continued)

FOREIGN PATENT DOCUMENTS

CN    101370366 B    8/2011
CN    108259649 A    7/2018

(Continued)

OTHER PUBLICATIONS

International Search Report dated Sep. 24, 2021.

(Continued)

*Primary Examiner* — Adrian S Wilson
(74) *Attorney, Agent, or Firm* — Cha & Reiter, LLC

(57) ABSTRACT

According to certain embodiments, an electronic device comprises a first housing including a first space; a second housing slidably coupled to the first housing to slide in a first direction in a slid-out state and retract in a second direction opposite the first direction in a slid-in state, the second housing and including a second space; a bendable member connected to the first housing and at least partially accommodated in the second space in the slid-in state and having at least a portion configured to form a substantially same plane as a surface of the first housing in the slid-out state; a flexible display including a first portion disposed so as to be visible from an outside of the electronic device in the slid-in state and a second portion extending from the first portion accommodated in the second space; and at least one electronic component disposed in the first space and exposed to (Continued)

the outside of the electronic device through a first hole in the first housing, wherein the first hole is disposed to overlap at least a portion of the second housing in the slid-in state and is exposed to the outside in the slid-out state.

20 Claims, 48 Drawing Sheets

(30) Foreign Application Priority Data

Oct. 12, 2020 (KR) .................. 10-2020-0131321
Oct. 12, 2020 (KR) .................. 10-2020-0131459

(56) References Cited

U.S. PATENT DOCUMENTS

| | | | |
|---|---|---|---|
| 7,724,508 B2 * | 5/2010 | Bemelmans | G06F 1/1615 |
| | | | 345/169 |
| 8,536,667 B2 * | 9/2013 | de Graff | A61B 8/12 |
| | | | 257/419 |
| 9,823,697 B2 * | 11/2017 | Hsu | G06F 1/1624 |
| 10,708,395 B1 | 7/2020 | Han | |
| 10,868,897 B2 | 12/2020 | Cha et al. | |
| 2003/0109286 A1 * | 6/2003 | Hack | H04M 1/0266 |
| | | | 455/566 |
| 2003/0218860 A1 * | 11/2003 | Shiraiwa | G06F 1/1622 |
| | | | 361/679.04 |
| 2004/0183958 A1 * | 9/2004 | Akiyama | G09F 9/30 |
| | | | 349/58 |
| 2005/0041012 A1 * | 2/2005 | Daniel | G09F 9/301 |
| | | | 345/156 |
| 2008/0153558 A1 | 6/2008 | Mifune et al. | |
| 2010/0177020 A1 | 7/2010 | Bemelmans et al. | |
| 2011/0051347 A1 | 3/2011 | Yamagiwa et al. | |
| 2012/0314400 A1 | 12/2012 | Bohn et al. | |
| 2013/0058063 A1 | 3/2013 | O'Brien | |
| 2017/0006738 A1 | 1/2017 | Lee et al. | |
| 2018/0181164 A1 | 6/2018 | Chen | |
| 2018/0188778 A1 | 7/2018 | Shin | |
| 2018/0329456 A1 * | 11/2018 | Myers | H04M 1/0268 |
| 2019/0098121 A1 | 3/2019 | Jeon et al. | |
| 2019/0146558 A1 * | 5/2019 | Ohata | G06F 1/16 |
| | | | 361/679.21 |
| 2019/0305237 A1 | 10/2019 | Shin et al. | |
| 2019/0346954 A1 | 11/2019 | Jung et al. | |
| 2019/0384438 A1 * | 12/2019 | Park | G06F 3/0482 |
| 2020/0201394 A1 | 6/2020 | Choi | |
| 2020/0218353 A1 | 7/2020 | Song et al. | |
| 2020/0264660 A1 | 8/2020 | Song et al. | |
| 2020/0329572 A1 | 10/2020 | Wittenberg et al. | |
| 2020/0371558 A1 * | 11/2020 | Kim | H04M 1/0268 |
| 2020/0409421 A1 | 12/2020 | Cho et al. | |
| 2021/0044683 A1 | 2/2021 | He et al. | |
| 2021/0116959 A1 | 4/2021 | Heo et al. | |
| 2021/0219437 A1 | 7/2021 | Kim et al. | |
| 2022/0019261 A1 * | 1/2022 | Kang | H04M 1/0277 |
| 2022/0232716 A1 * | 7/2022 | Lim | H01L 51/00 |
| 2022/0240400 A1 | 7/2022 | Zhou | |

FOREIGN PATENT DOCUMENTS

| | | |
|---|---|---|
| CN | 110599912 A | 12/2019 |
| CN | 110839095 A | 2/2020 |
| JP | 2011-49805 A | 3/2011 |
| KR | 10-2008-0058168 A | 6/2008 |
| KR | 10-2011-0066562 A | 6/2011 |
| KR | 10-2014-0059274 A | 5/2014 |
| KR | 10-1606064 B1 | 3/2016 |
| KR | 10-2017-0004068 A | 1/2017 |
| KR | 10-2018-0039027 A | 4/2018 |
| KR | 10-2019-0034063 A | 4/2019 |
| KR | 10-2019-0077107 A | 7/2019 |
| KR | 10-2019-0086305 A | 7/2019 |
| KR | 10-2019-0106322 A | 9/2019 |
| KR | 10-2019-0128843 A | 11/2019 |
| KR | 10-2019-0141518 A | 12/2019 |
| KR | 10-2019-0143029 A | 12/2019 |
| KR | 10-2020-0007510 A | 1/2020 |
| KR | 10-2020-0079002 A | 7/2020 |
| WO | 2022/014907 A1 | 1/2022 |

OTHER PUBLICATIONS

International Search Report dated Oct. 12, 2021.
International Search Report dated Oct. 8, 2021.
International Search Report dated Oct. 22, 2021.
European Search Report dated May 18, 2022.

* cited by examiner

ELECTRONIC DEVICE INCLUDING ELECTRONIC COMPONENT ARRANGEMENT STRUCTURE

CROSS-REFERENCE TO RELATED APPLICATION(S)

This application is based on and claims priority under 35 U.S.C. 119 to Korean Patent Application No. 10-2020-0086823 filed on Jul. 14, 2020, Korean Patent Application No. 10-2020-0129528 filed on Oct. 7, 2020, Korean Patent Application No. 10-2020-0131321 filed on Oct. 12, 2020, Korean Patent Application No. 10-2020-0131459 filed on Oct. 12, 2020 and Korean Patent Application No. 10-2020-0178293 filed on Dec. 18, 2020 in the Korean Intellectual Property Office, the disclosure of which is herein incorporated by reference in its entirety.

BACKGROUND

1) Field

Certain embodiments relate to an electronic device including an electronic component arrangement structure.

2) Description of Related Art

Electronic devices are being gradually being made thinner while preserving or increasing rigidness. Electronic devices are gradually departing from a uniform rectangular shape to have different shapes. An electronic device may also have a deformable structure that makes it easier to carry the electronic device, while at the same time, allowing a large screen display to be used. With the changing shape of electronic devices, it becomes important to appropriately place internal electronic components in consideration of the structure of the electronic device.

The above information is presented as background information only to assist with an understanding of the disclosure. No determination has been made, and no assertion is made, as to whether any of the above might be applicable as prior art with regard to the disclosure.

SUMMARY slid-inslid-out According to certain embodiments, an electronic device comprises a first housing including a first space; a second housing slidably coupled to the first housing to slide in a first direction in a slid-out state and retract in a second direction opposite the first direction in a slid-in state, the second housing and including a second space; a bendable member connected to the first housing and at least partially accommodated in the second space in the slid-in state and having at least a portion configured to form a substantially same plane as a surface of the first housing in the slid-out state; a flexible display including a first portion disposed so as to be visible from an outside of the electronic device in the slid-in state and a second portion extending from the first portion accommodated in the second space; and at least one electronic component disposed in the first space and exposed to the outside of the electronic device through a first hole in the first housing, wherein the first hole is disposed to overlap at least a portion of the second housing in the slid-in state and is exposed to the outside in the slid-out state.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

An electronic device may be capable of varying the display area of a flexible display by supporting housings that operate in a sliding manner with respect to each other (e.g., a rollable structure or a slidable structure). Such an electronic device may include an arrangement of electronic components based on the coupling structure of the housings that operate in a sliding manner.

Among the electronic devices, a deformable slidable electronic device (e.g., a rollable electronic device) may have a display area that can be expanded when used. The slidable electronic device may include a first housing (e.g., a first housing structure, a base housing, a base bracket, or a base structure) and a second housing (e.g., a second housing structure, a slide housing, a slide bracket, or a slide structure), which are movably coupled and at least partially fitted together. For example, the first housing and the second housing are slidably operated with respect to each other and support at least a portion of a flexible display (or an expandable display). In a slid-in state, the flexible display can have a first display area, and in a slid-out state, the flexible display can have a second display area that is larger than the first display area.

The slidable electronic device may include multiple electronic components disposed in the internal space thereof. Since these electronic components require different mounting spaces, it is necessary to properly arrange the electronic components in the internal spaces of the housings, which are slidable with respect to each other. For example, electronic components that perform their functions by being connected to the outside may be arranged in the internal spaces of the electronic device at positions corresponding to one or more openings provided in the housings.

However, when these electronic components are arranged in the internal space of the second housing, which performs the sliding operation, a support structure is provided only by the side surface thereof due to a flexible display, which may result in less rigidity. In addition, when an electronic device has an arrangement structure in which the openings corresponding to the electronic components that are not frequently used are always exposed to the outside of the electronic device, the aesthetics of the electronic device may be less pleasing.

Certain embodiments are capable of providing an electronic device including an electronic component arrangement structure.

According to certain embodiments, it is possible to provide an electronic device including an electronic component arrangement structure capable of being firmly supported in the internal space of a housing thereof.

According to certain embodiments, it is possible to provide an electronic device including an electronic component arrangement structure, which is helpful for improving the aesthetics of the electronic device.

Electronic Device

Figure 1:
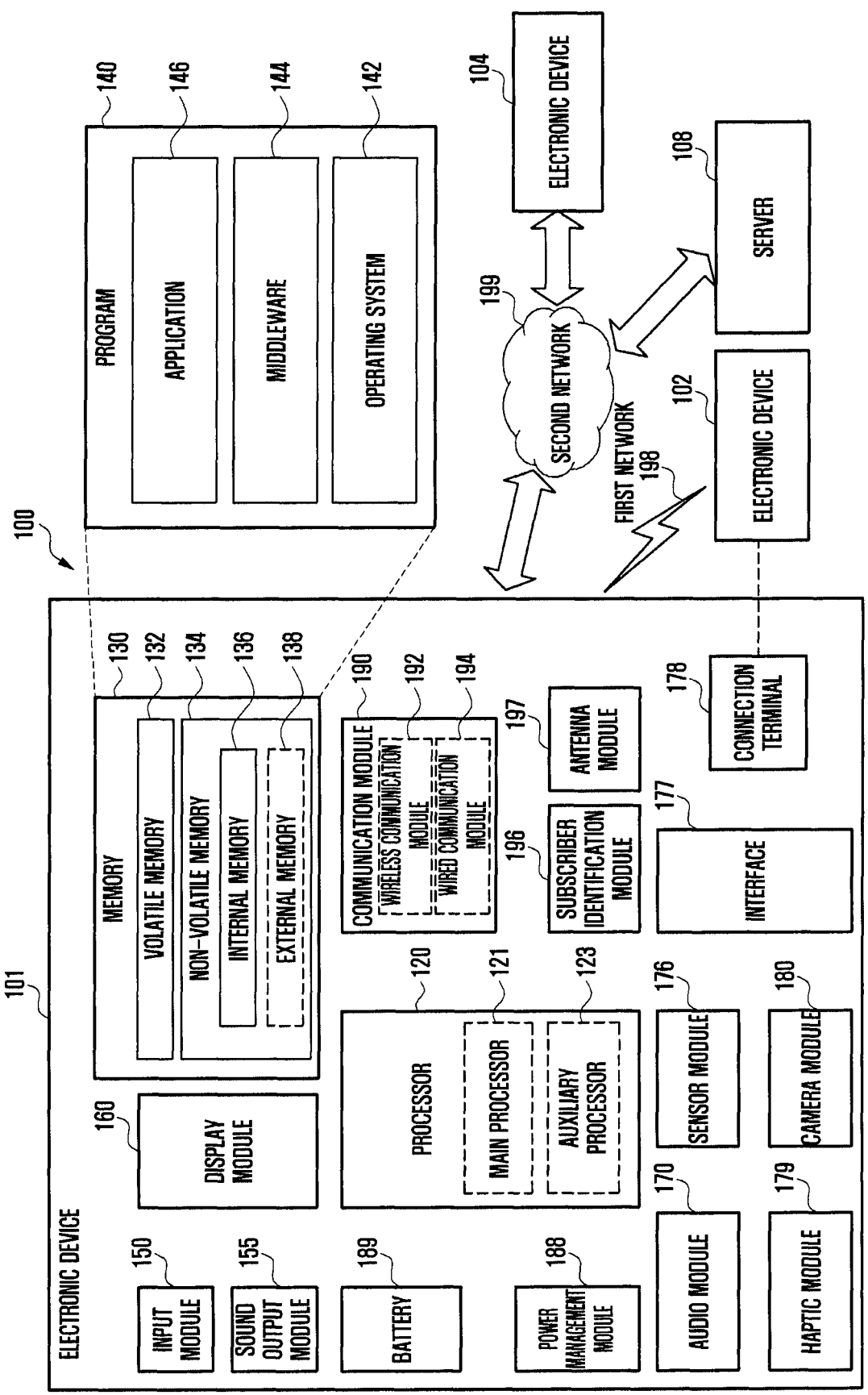
FIG. 1 is a block diagram of an electronic device according to certain embodiments in a network environment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The portability of the electronic device 101 and the size of the display module 160 can become competing goals. A larger display module 160 provides a more pleasing experience for user. However, it can cause the electronic device 100 to have increased size dimensions. Increased size dimensions make it difficult for the user to carry in a pocket or on their person.

To provide larger display module 160 without reducing the portability of the electronic device 101, the display module 160 can include a flexible display. The visible area of the flexible display can be expanded when the user is actually looking at the display module 160 of the electronic device and reduced when the user is not looking at the display module 160.

Housing of the Electronic Device

Figure 5:
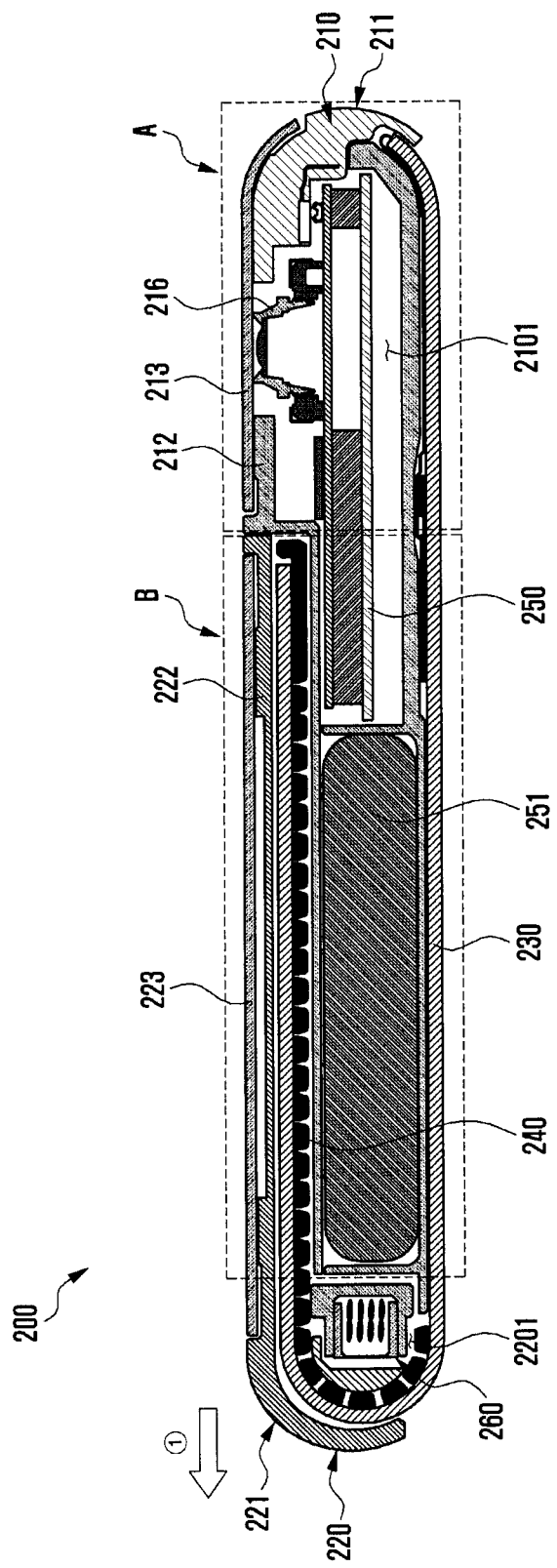
FIG. 5 is a cross-sectional view of the electronic device according to certain embodiments taken along line 5-5 in FIG. 3A.

Referring to FIG. 5, an electronic device 200 can include a first housing 210 and a second housing 220. The second housing 220 can be slidably coupled to the first housing 210. The second housing 220 can slide in direction ① by up to a certain distance, while coupled to the first housing 210, and retract in direction ②. Thus, when the second housing 220 is slid in direction ①, away from the first housing 210, the electronic device 200 is considered in the slid-out state (as shown in FIG. 6). When the second housing 220 retracted in direction ② from the first housing 210 (as shown in FIG. 5) the device is said to be in the slid-in state.

A portion of a flexible display 230 is disposed on a surface of the first housing 210. In the slid-in state, the remaining portion of the flexible display 230 is disposed in the internal space of the second housing 220. In the slid-out state, the remaining portion of the flexible display 220, facilitated by a bendable member 240 rolls out from the interior of the second housing 220 to form a continuous plane with the portion of the flexible display 220 that is disposed on the surface of the first housing 210.

Figure 2A:
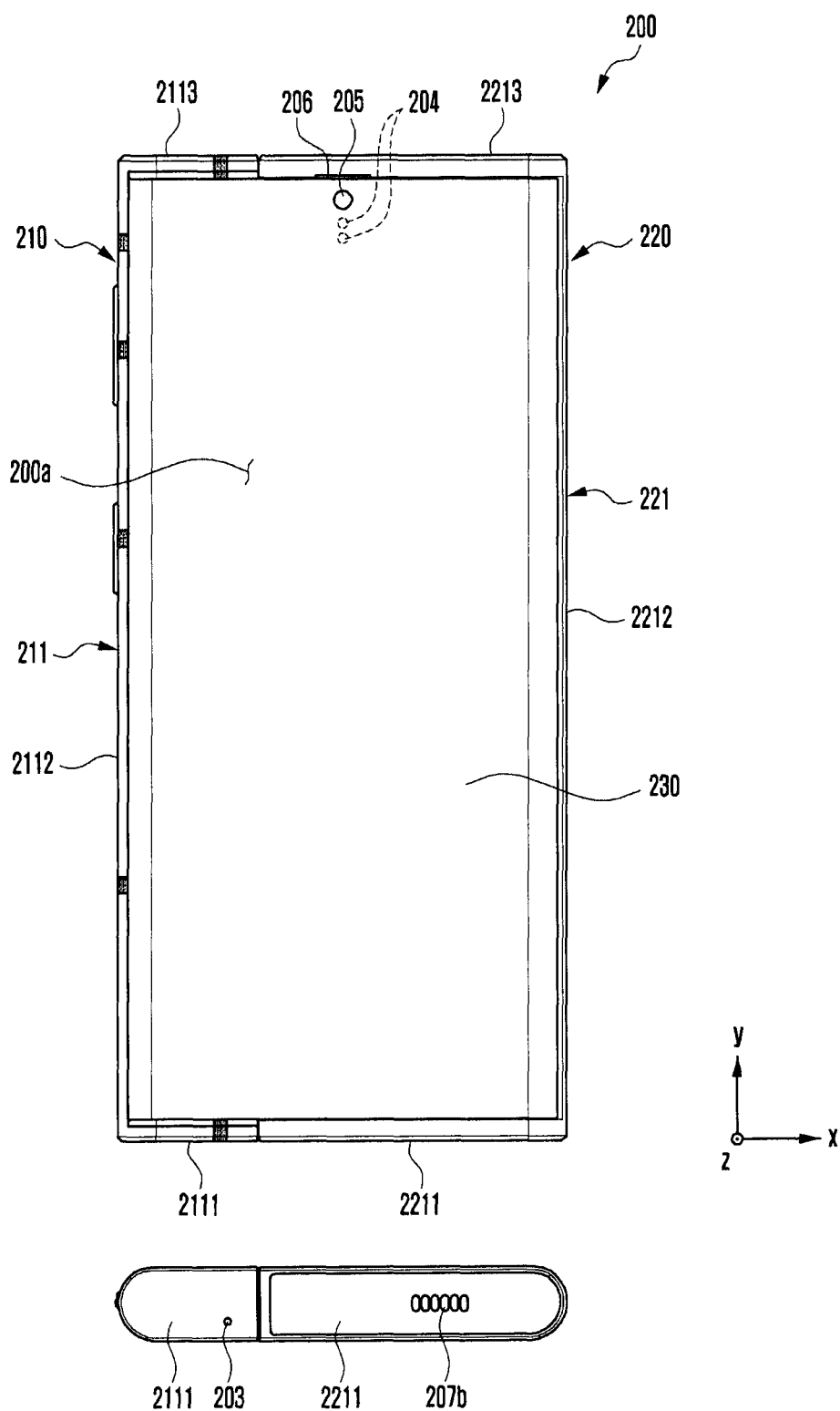
FIG. 2A is a view illustrating the front surface of an electronic device according to certain embodiments in the slid-in state.
Figure 2B:
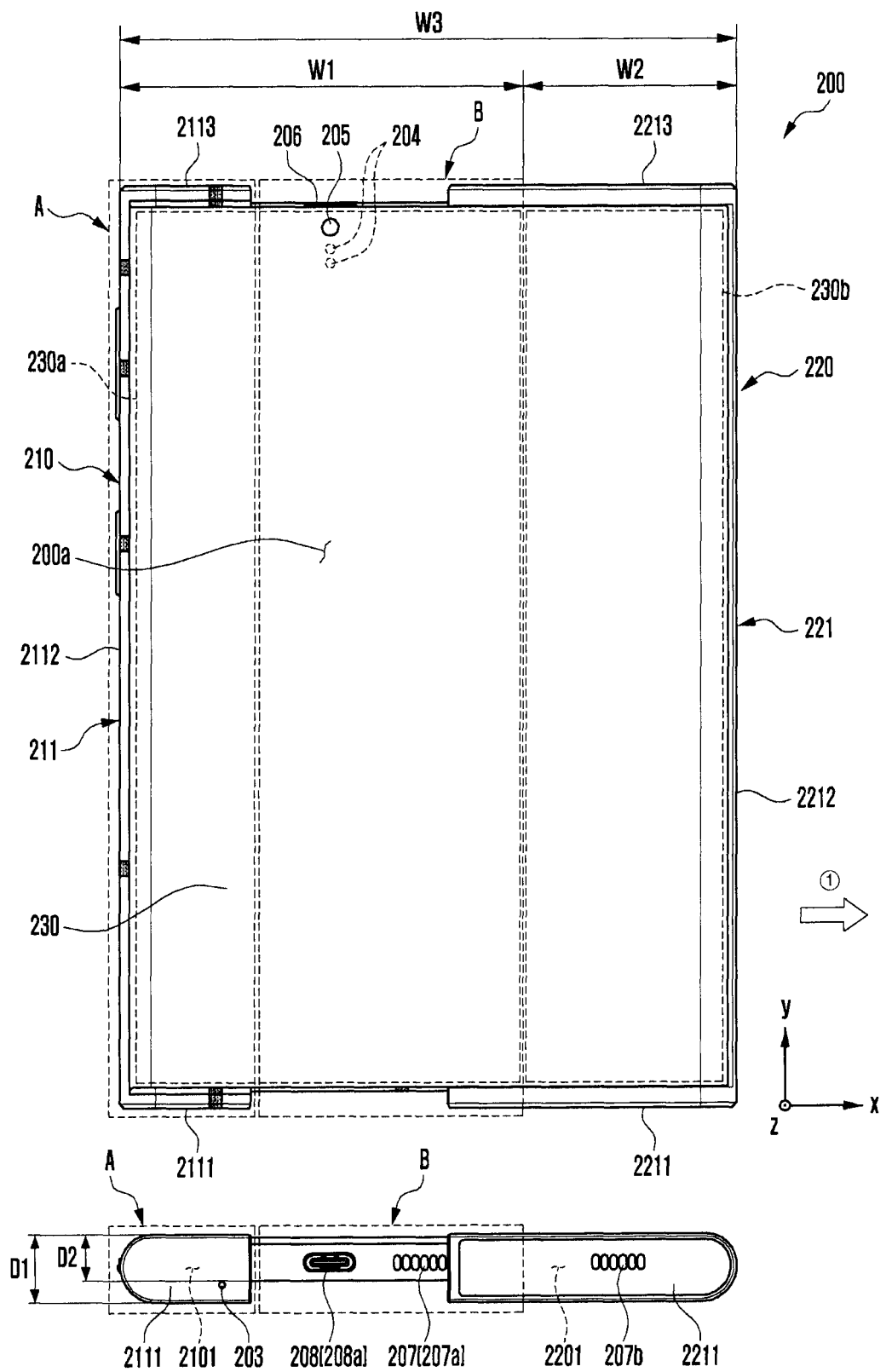
FIG. 2B is a view illustrating the front surface of the electronic device according to certain embodiments in the slid-out state.
Figure 3A:
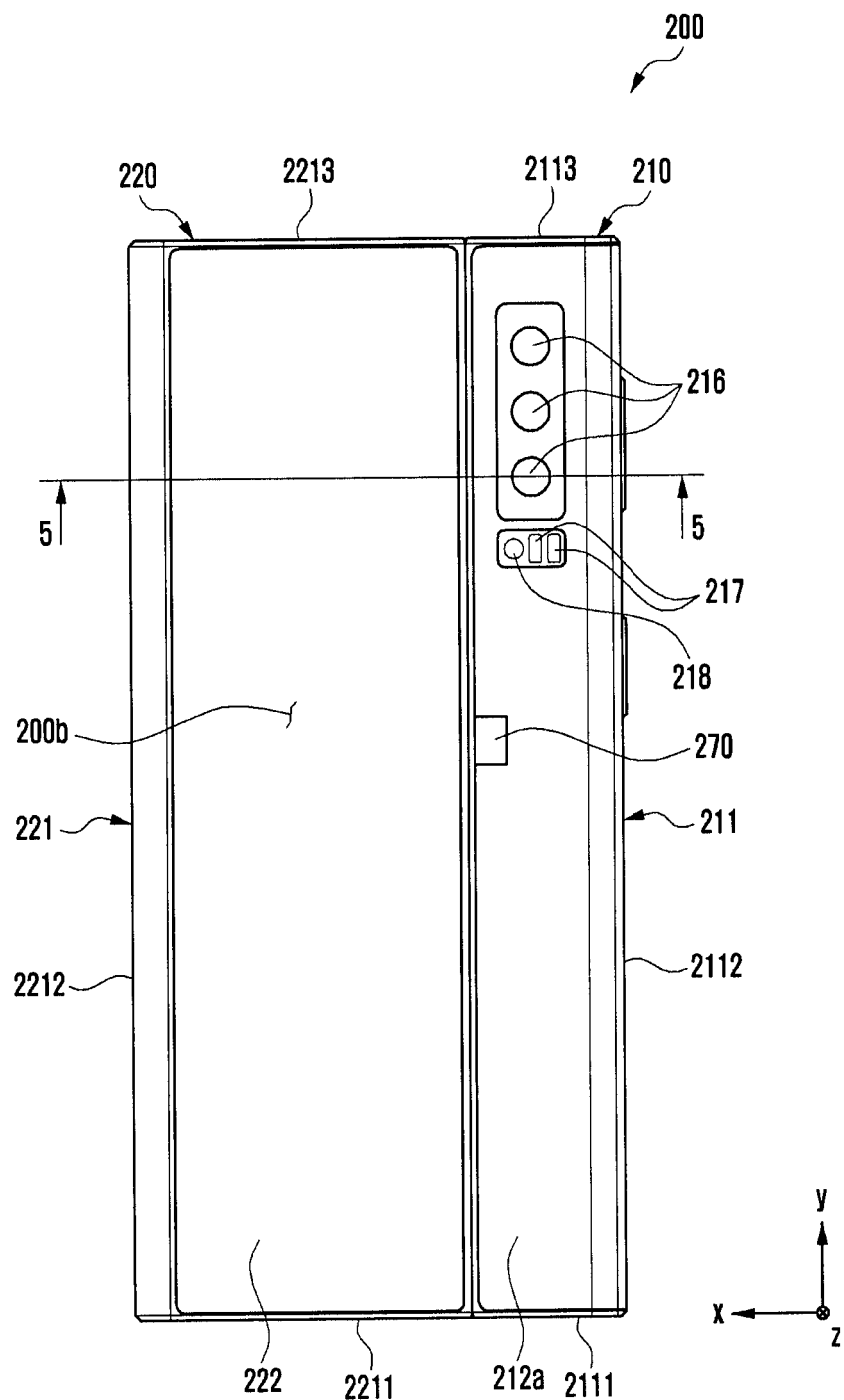
FIG. 3A is a view illustrating the rear surface of the electronic device according to certain embodiments in the slid-in state.
Figure 3B:
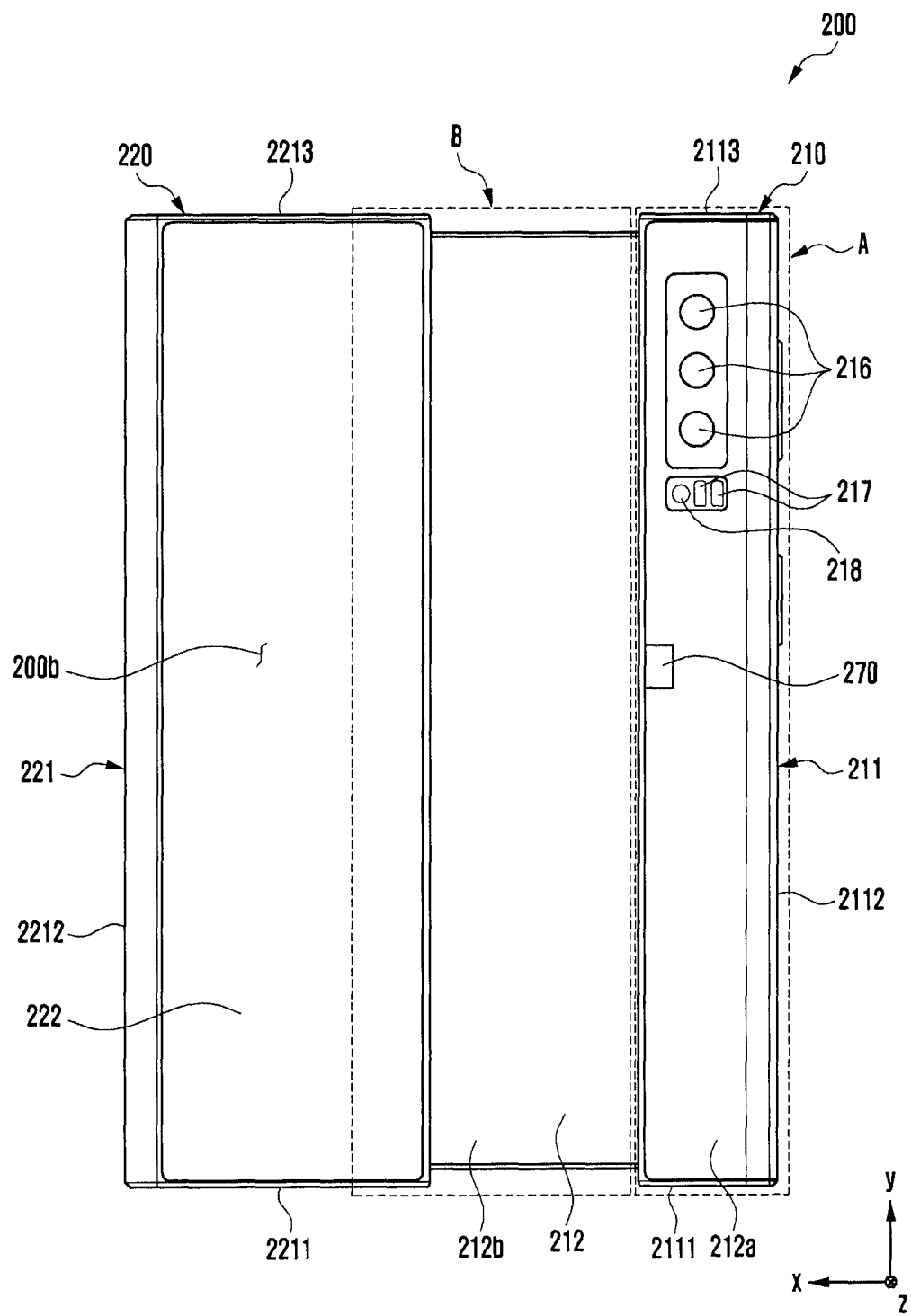
FIG. 3B is a view illustrating the rear surface of the electronic device according to certain embodiments in the slid-out state.

FIG. 2A is a view illustrating the front and side surfaces of an electronic device according to certain embodiments in the slid-in state, and FIG. 2B is a view illustrating the front and side surfaces of the electronic device according to certain embodiments in the slid-out state. FIG. 3A is a view illustrating the rear surface of the electronic device according to certain embodiments in the slid-in state, and FIG. 3B is a view illustrating the rear surface of the electronic device according to certain embodiments in the slid-out state.

The electronic device 200 of FIGS. 2A to 3B may be at least partially similar to the electronic device 101 of FIG. 1, or may further include other embodiments of the electronic device.

Referring to FIGS. 2A to 3B, the electronic device 200 may include a first housing 210, and a second housing 220 coupled to the first housing 210. The second housing is movable by up to a predetermined reciprocating distance from the first housing 210 in a first direction ①. The electronic device includes a flexible display 230 supportable by at least a portion of the first housing 210 and the second housing 220. The first housing 210 can be referred to as a first housing structure or a base housing. The second housing 220 can be referred to as a second housing structure or a slide housing.

The electronic device 200 may include a bendable member or a bendable support member (e.g., the bendable member 240 in FIG. 5,4 or a multi joint hinge module). At least a portion of the bendable member 240 forms substantially the same plane as a surface of the first housing 210 in the slid-out state. In certain embodiments, the bendable member 240 and a surface of the first housing 210 can form sufficiently the same plane as the surface of the first housing 210 such that a flexible display 230 disposed on the surface of the first housing 210 and the bendable member 240 appears continuous surface. In the slid-in state, the bendable member is at least partially accommodated into the internal space (e.g., the second space 2201 in FIG. 5) of the second housing 220 slid-in. The foregoing shall be collectively referred to as "substantially the same plane."

In the slid-in state, at least a portion of the flexible display 230 may be accommodated into the internal space of the second housing 220 (e.g., the second space 2201 in FIG. 5) while being supported by the bendable member. As a result, the flexible display 230 is invisible from the outside. At least a portion of the flexible display 230 may be disposed to be visible from the outside while being supported by the bendable member.

The electronic device 200 may include a front surface, or a first surface 200a, a rear surface, or a second surface 200b facing away from the front surface 200a, and a side surface (not illustrated) surrounding the space between the front surface 200a and the rear surface 200b. The electronic device 200 may include a first housing 210 including a first side member 211 and a second housing 220 including a second side member 221.

The first side member 211 may include a first side surface 2111 having a first length along a first direction (the x-axis direction), a second side surface 2112 extending from the first side surface 2111 in a direction substantially perpendicular or sufficiently perpendicular so as to appear perpendicular to the naked eye (now collectively referred to as "substantially perpendicular"), thereto and having a second length that is longer than the first length, and a third side surface 2113 extending from the second side surface 2111 to be substantially parallel, or sufficiently parallel so as to appear parallel to the naked eye (now collectively referred to as "substantially parallel"), to the first side surface 2111 and having a length substantially equal to the first length, or within a deviation of the first length that is not perceivable to the naked eye (now collectively referred to as "substantially equal").

At least a portion of the first side member 211 may be formed of a conductive material, such as metal, and may be used as an antenna radiator. At least a portion of the first side member 211 may include a first support member 212 extending to at least a portion of the internal space of the first housing 210 (e.g., the first space 2101 in FIG. 5).

The second side member 221 may include a fourth side surface 2211 at least partially corresponding to the first surface 2111 and having a third length, a fifth side surface 2212 extending from the fourth side surface 2211 in a direction substantially parallel to the second side surface 2112 and having a fourth length that is longer than the third length, and a sixth side surface 2213 extending from the fifth side surface 2212 to correspond to the third side surface 2113 and having a length substantially equal to the third length.

At least a portion of the second side member 221 may be formed of a conductive material, such as metal and used as an antenna radiator. At least a portion of the second side member 221 may include a second support member 222 extending to at least a portion of the internal space of the second housing 220 (e.g., the second space 2201 in FIG. 5). The first side 2111 and the fourth side 2211 may be slidably coupled to each other, and the third side 2113 and the sixth side 2213 may be slidably coupled to each other.

In the slid-in state, at least a portion of the first side surface 2111 may overlap at least a portion of the fourth side surface 2211, whereby the remaining portion of the first side 2111 may be visible from the outside. In the slid-in state, at least a portion of the third side surface 2113 may overlap at least a portion of the sixth side surface 2213, whereby the remaining portion of the third side 2113 may be visible from the outside.

In the slid-in state, at least a portion of the first support member 212 may overlap at least a portion of the second support member 222, and the remaining portion of the first support member 212 may be visible from the outside. Accordingly, the first support member 212 includes a non-overlapping portion 212*a* that does not overlap the second support member 222 in the slid-in state and an overlapping portion 212*b* that overlaps the second support member 222 in the slid-in state. In some embodiments, the non-overlapping portion 212*a* and the overlapping portion 212*b* may be integrally formed. In some embodiments, the non-overlapping portion 212*a* and the overlapping portion 212*b* may be provided separately, and may be structurally coupled to each other.

In the first space 2101, the first housing 210 may include a first sub-space A corresponding to the non-overlapping portion 212*a* and a second sub-space corresponding to the overlapping portion 212*b*. The first sub-space A and the second sub-space B may be disposed so as to be at least partially connected to each other or to be separated from each other. The first sub-space A may have a larger spatial volume than the second sub-space B. This may be due to an overlapping structure in which the second support member 222 and the first support member 212 overlap in an area corresponding to the second sub-space B.

The electronic device 200 may include multiple electronic components (e.g., a camera module 216, a sensor module 217, a flash 218, a main board (e.g., the main board 250 in FIG. 4) or a battery (e.g., the battery 251 in FIG. 4)) disposed in the first space of the first housing 210 (e.g., the first space 2101 in FIG. 5). The first sub-space A may be used as an area in which, for example, electronic components that require a relatively large mounting space (a relatively large mounting height) or have to be operated in the state of avoiding an overlapping structure (e.g., a camera module 216, a sensor module 217, or a flash 218) are disposed. The second sub-space B may be used as an area in which, for example, electronic components that require a relatively small mounting space (a relatively small mounting height) or are capable of operating regardless of an overlapping structure (e.g., the main board (PCB) 250 in FIG. 4 or a battery (e.g., the battery 251 in FIG. 4)) are disposed.

The areas of the front surface 200*a* and the rear surface 200*b* of the electronic device 200 may vary according to the sliding-in state and the sliding-out state. In some embodiments, on the rear surface 200*b*, the electronic device 200 may include a first rear cover (e.g., the first rear cover 213 in FIG. 4) disposed in at least a portion of the first housing 210 and a second rear cover (e.g., the second rear cover 223 in FIG. 3) disposed in at least a portion of the second housing 220. In this case, the first rear cover 213 and the second rear cover 223 may be integrally formed with the side members 211 and 221, respectively. In some embodiments, the first rear cover 213 and the second rear cover 223 may be separately disposed on the first support member 212 and the second support member 213, respectively. According to an embodiment, the first rear cover 213 and/or the second rear cover 223 may be formed of a polymer, coated or colored glass, ceramic, or a metal (e.g., aluminum, stainless steel (STS), or magnesium), or a combination of two or more of these materials. In some embodiments, the first rear cover 213 and the second rear cover 223 may extend to at least a portion of the side member 211 and at least a portion of the side member 221, respectively. In some embodiments, at least a portion of the first support member 212 may be replaced with the first rear cover 213, and at least a portion of the second support member 222 may be replaced with the second rear cover 223.

The electronic device 200 may include a flexible display 230 supported by at least a surface of the first housing 210 and at least a portion of the second housing 220. The flexible display 230 may include a first portion 230*a* (e.g., a flat portion) that is always visible from the outside, and a second portion 230*b* (e.g., a bendable portion) extending from the first portion 230*a* and at least partially slid into the internal space of the second housing 220 (e.g., the first space 2201 in FIG. 5). The second portion 230*b* can be slid into the internal space of the second housing 220 to be invisible from the outside in the slid-in state.

The first portion 230*a* may be disposed so as to be supported by a surface of the first housing 210, and the second portion 230*b* may be disposed so as to be at least partially supported by the bendable member (e.g., the bendable member 240 in FIG. 5). In the state in which the second housing 220 is slid out along a predetermined first direction (direction ①), the flexible display 230 may extend from the first portion 230*a* while being supported by the bendable member (e.g., the bendable member 240 in FIG. 5), may form substantially the same plane as the first portion 230*a*, and may be disposed to be visible from the outside. In the state in which the second housing 220 is slid-in along a predetermined second direction (–X axis direction), the second portion 230*b* of the flexible display 230 may be slid into the internal space of the second housing 220 (e.g., the second space 2201 in FIG. 5), and may not be visible from the outside. Accordingly, in the electronic device 200, as the second housing 220 moves in a sliding manner along a predetermined direction from the first housing 210, the display area of the flexible display 230 may be variable.

The first housing 210 and the second housing 220 may be operated with respect to each other in a sliding manner such that the entire width is variable. The electronic device 200 may be configured to have a first width W1 from the second side surface 2112 to the fourth side surface 2212 in the slid-in state. The electronic device 200 may be configured such that, in the slid-out state, a portion of the bendable member (e.g., the bendable member 240 in FIG. 5) slides into the internal space of the second housing 210 (e.g., the second space 2201 in FIG. 5) is moved so as to have an additional second width W2, whereby the electronic device 200 has a third width W3 that is greater than the first width W1. For example, in the slid-in state, the flexible display 230 may have a display area substantially corresponding to the first width W1, and in the slid-out state, the flexible display 230 may have an expanded display area substantially corresponding to the third width W3.

According to certain embodiments, the slid-out operation of the electronic device 200 may be performed through a user's manipulation. For example, the second housing 220 may be slid out in the predetermined first direction (e.g., direction ①) through the manipulation of a lock 270 exposed through the rear surface 200*b* of the electronic device. In this case, the lock 270 may be disposed on the first housing 210, and the second housing 220 may be regulated such that the second housing 220, which is always pressed in the slid-out direction (e.g., direction ①) by a support assembly (e.g., the support assembly 260 in FIG. 4) to be described later, is maintained in the slid-in state. In some embodiments, the electronic device 200 may be shifted from the slid-in state to the slid-out state through the user's manipulation that presses the outer surface of the flexible display 230 in the predetermined first direction (direction ①). In some embodiments, the second housing 220 may be automatically operated by a drive mechanism (e.g., a drive motor, a reduction module, and/or a gear assembly) disposed in the internal space of the first housing 210 (e.g., the first space 2101 in FIG. 5) and/or the internal space of the second housing 220 (e.g., the second space 2201 in FIG. 5). The electronic device 200 may be set to control the operation of the second housing 220 via the drive mechanism when an event for shifting between the slid-in state and the slid-out state of the electronic device is detected via a processor (e.g., the processor 120 in FIG. 1). In some embodiments, the processor of the electronic device 200 (e.g., the processor 120 in FIG. 1) may control the flexible display 230 to display an object in various ways and execute an application in response to the display area of the flexible display 230 changed according to the slid-in state, the slid-out state, or the intermediate state (e.g., including a free stop state).

The electronic device 200 may include at least one of an input device 203, sound output devices 206 and 207, sensor modules 204 and 217, camera modules 205 and 216, a connector port 208, a key input device (not illustrated), or an indicator (not illustrated) disposed in the first space of the first housing 210 (e.g., the first space 2101 in FIG. 5). In another embodiment, the electronic device 200 may be configured such that at least one of the above-mentioned components is omitted or other components are additionally included.

The input device 203 may include a microphone. In some embodiments, the input device 203 may include multiple microphones 203 arranged to sense the direction of sound. The sound output devices 206 and 207 may include speakers. The sound output devices 206 and 207 may include a call receiver 206 and an external speaker 207. According to an embodiment, in the slid-out state, the external speaker 207 may face the outside through a first speaker hole 207*a* disposed in the first housing 210. In the slid-in state, the external speaker 207 may face the outside through the first speaker hole 207*a* and a second speaker hole 207*b* disposed in the second housing 220 to correspond to the first speaker hole 207*a*. In the slid-out state, the connector port 208 may face the outside through a connector port hole 208*a* disposed in the first housing 210. In the slid-in state, the connector port 208 may be covered by the second housing 220 so as to be invisible from the outside. In some embodiments, even in the slid-in state, the connector port 208 may face the outside through another connector port hole disposed in the second housing 220 so as to correspond to the connector port hole 208*a*. In some embodiments, the sound output device 206 may include a speaker that is operated without a separate speaker hole (e.g., a piezo speaker).

The sensor modules 204 and 217 may generate an electrical signal or a data value corresponding to the internal operating state of the electronic device 200 or an external environmental state. The sensor modules 204 and 217 may include, for example, a first sensor module 204 (e.g., a proximity sensor or an illuminance sensor) disposed on the front surface 200*a* of the electronic device 200 and/or a second sensor module 217 (e.g., a heart rate monitoring (HRM) sensor) disposed on the rear surface 200*b*. According to an embodiment, the first sensor module 204 may be disposed under the flexible display 230 in the front surface 220*a* of the electronic device 200. According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

The camera modules 205 and 216 may include a first camera module 205 disposed on the front surface 200*a* of the electronic device 200 and a second camera module 216 disposed on the rear surface 200*b*. The electronic device 200 may include a flash 218 disposed in the vicinity of the second camera module 216. The camera modules 205 and 216 may include one or more lenses, an image sensor, and/or an image signal processor. The first camera module 205 may be disposed under the flexible display 230, and may be configured to image an object through a portion of an active area of the flexible display 230. The flash 218 may include, for example, a light-emitting diode or a xenon lamp.

The first camera module 205 among the camera modules 205 and 216 and the sensor module 204 among the sensor modules 204 and 217 may be disposed so as to the external environment through the flexible display 230. For example, the first camera module 205 or the sensor module 204 may be disposed in the internal space of the electronic device 200 to be in contact with the external environment through a transmission area or an opening perforated in the flexible display 230. The area of the flexible display 230, which faces the first camera module 205, may be formed as a transmission area having a predetermined transmittance as a portion of a content display area. The transmission area may have a transmittance in the range of about 5% to about 20%. The transmission area may include an area overlapping the effective area (e.g., the view angle area) of the first camera module 205 through which light imaged by an image sensor to generate an image passes. For example, the transmission area of the flexible display 230 may include an area having a lower pixel density and/or a lower wiring density than the surrounding area. For example, the transmission area may replace the above-mentioned opening. For example, the first camera module 205 may include an under display camera (UDC). In some embodiments, the sensor module 204 may be disposed to perform the function thereof without being visually exposed through the flexible display 230 in the internal space of the electronic device 200.

Figure 4:
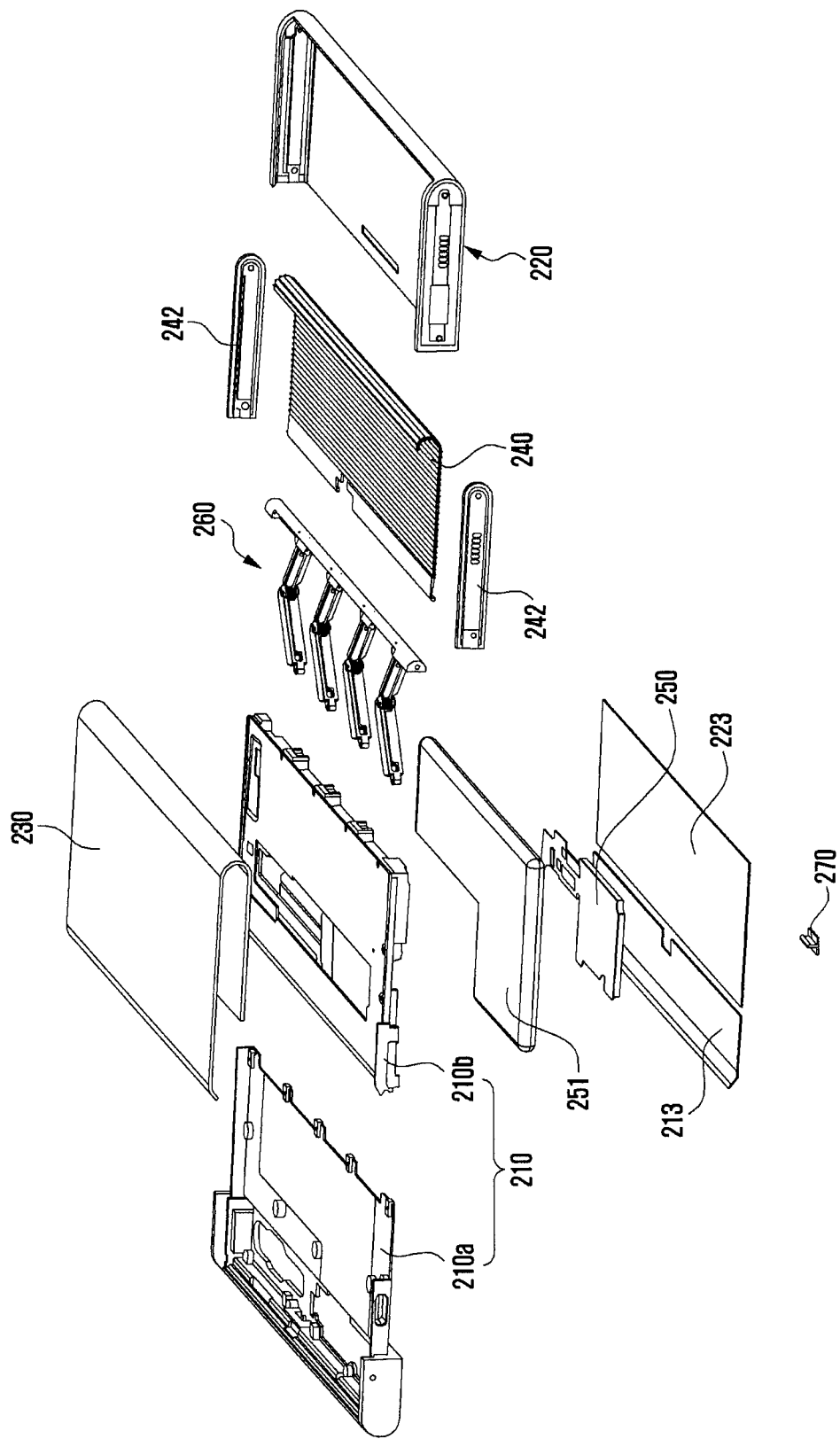
FIG. 4 is an exploded perspective view of an electronic device according to certain embodiments.

FIG. 4 is an exploded perspective view of an electronic device according to certain embodiments.

Referring to FIG. 4, the electronic device 200 may include a first housing 210 including a first space (e.g., the first space 2101 in FIG. 5), and a second housing 220 slidably coupled to the first housing 210 and including a second space (e.g., the second space 2201 in FIG. 5). A bendable member 240 may be disposed in the second space (e.g., the second space 2201 in FIG. 5) to be at least partially rotatable, and a flexible display 230 disposed so as to be supported on at least a portion of the bendable member 240 and the first housing 210. The first space of the first housing 210 (e.g., the first space 2201 in FIG. 5) may be provided through the coupling of the first bracket housing 210a and the second bracket housing 210b. In some embodiments, at least a portion of the first bracket housing 210a may include a first support member (e.g., the first support member 212 in FIG. 3B), or may be replaced by the first support member 212. The electronic device 200 may include a main board 250 disposed in the first space (e.g., the first space 2201 in FIG. 5). The electronic device 200 may include a camera module (e.g., the camera module 216 in FIG. 3A) disposed on the board 250 or a sensor module (e.g., the sensor module 217 in FIG. 3A) in the first space (e.g., the first space 2101 in FIG. 5). One end of the bendable member 240 may be fixed to the first housing 210 and the other end may be disposed so as to be at least partially rotatably accommodated in the second space of the second housing 220 (e.g., the second space 2201 in FIG. 5). For example, in the slid-in state, the bendable member 240 may be at least partially accommodated in the second space (e.g., the second space 2201 in FIG. 5), and in the slid-out state, the bendable member 240 may be at least partially slid out from the second space (e.g., the second space 2201 in FIG. 5) to form substantially the same plane as a surface of the first housing 210. Accordingly, the display area of the flexible display 230 supported by surface of the first housing 210 and the bendable member 240 may vary according to the sliding operation. The electronic device 200 may further include guide rails 242 disposed on the side surfaces of the coupled first and second bracket housings 210a and 210b to be guided into the internal space of the second housing 220 (e.g., the second space 2201 in FIG. 5). In some embodiments, the electronic device 200 may further include a cover member (not illustrated) disposed so as to cover both sides of the second support member of the second housing 220 (e.g., the second support member 222 in FIG. 3B).

The electronic device 200 may include a support assembly 260 disposed so as to face the second space (e.g., the second space 2201 in FIG. 5) from the first housing 210 and pressing the second housing 220 in the slid-out direction. The support assembly 260 may reduce sagging of the flexible display 230 by supporting the bendable member 240 during operation. The support assembly 260 may be fixed to the first housing 210, and may guide the second housing 220 in the slid-out direction by pressing the rear surface of the bendable member 240. The electronic device 200 may include a lock 270 for maintaining the electronic device 200 in the slid-in state while regulating the pressing force applied by the support assembly 260. According to an embodiment, the lock 270 may be disposed so as to be movable in the first housing 210, and may regulate the movement of the second housing 220 in the slid-out direction from the slid-in state.

FIG. 5 is a cross-sectional view of the electronic device according to certain embodiments taken along line 5-5 in FIG. 3A.

Referring to FIG. 5, the electronic device 200 may include a first housing 210 having a first space 2101, a second housing 220 having a second space 2201, a bendable member 240 connected to the first housing and at least partially accommodated in the second space 2201 in the slid-in state, a flexible display 230 disposed so as to be supported by at least a portion of the bendable member 240 and at least a portion of the first housing 210, and a support assembly 260 disposed in the first housing 210 and pressing the second housing 220 in the slid-out direction (direction ①). The electronic device 200 may include multiple electronic components therein. The multiple electronic components may be disposed in the first space 2101 of the first housing 210. The first space 2101 may include a first sub-space A having a first space volume and a second sub-space B connected to the first sub-space A and having a second space volume that is smaller than the first space volume. The second sub-space B may include a space corresponding to an area in which a portion of the first housing 210 overlaps a portion of the second housing 220 when the electronic device is in the slid-in state.

Electronic components having a relatively large mounting height, first electronic components, in the electronic device 200, may be disposed in the first sub-space A. The first electronic components may include a camera module 216, a sensor module (e.g., the sensor module 217 in FIG. 3B), or a flash (e.g., the flash 218 in FIG. 3B). In this case, at least some of the first electronic components may be disposed to face the external environment through the first support member 212 and/or the first rear cover 213. Electronic components using a relatively small mounting space, second electronic components, or capable of operating regardless of the overlapping structure of the two housings 210 and 220 may be disposed in the second sub-space B. The second electronic components may include a main board 250 and/or a battery 251. In some embodiments, when the first sub-space A and the second sub-space B are connected to each other, some of the multiple electronic components (e.g., the main board 250 or an FPCB) may be disposed together in the two sub-spaces.

In the electronic device 200, electronic components may be disposed to correspond to the sub-spaces A and B having different space volumes in the first space 2101 of the first housing 210. Thus, an efficient arrangement structure may be helpful for making the electronic device 200 thinner and improving the performance of the electronic device 200. In addition, the coupling structure of the first housing 210 and the second housing 220 and/or the coupling structure of the support assembly 260 for pressing the second housing 220 to the slid-out state may provide a support function for an external force in the slid-out state.

Support Assembly

A support assembly 260 can be connected to the first housing 210 and a pressing member 265 of the second housing 220. The support assembly 260 can be physically expandable and contractable in the first direction. Accordingly, the slid-out state can be realized when the support assemblies 260 are expanded and the slid-in state can be realized when the support assemblies 260 are contracted. When the electronic device is in the slid-out state, the support assemblies 260 prevent the bendable member 240 and the flexible display 230 from sagging downwards into the interior of the second housing 220.

Figure 6A:
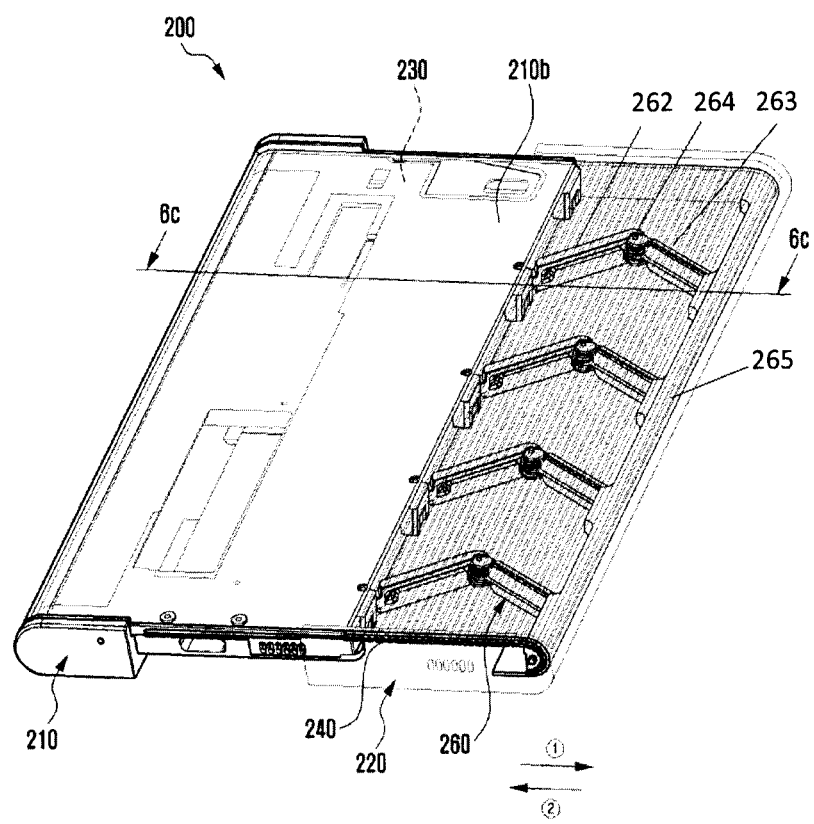
FIG. 6A is a view illustrating the configuration of an electronic device including a support assembly according to certain embodiments.
Figure 6B:
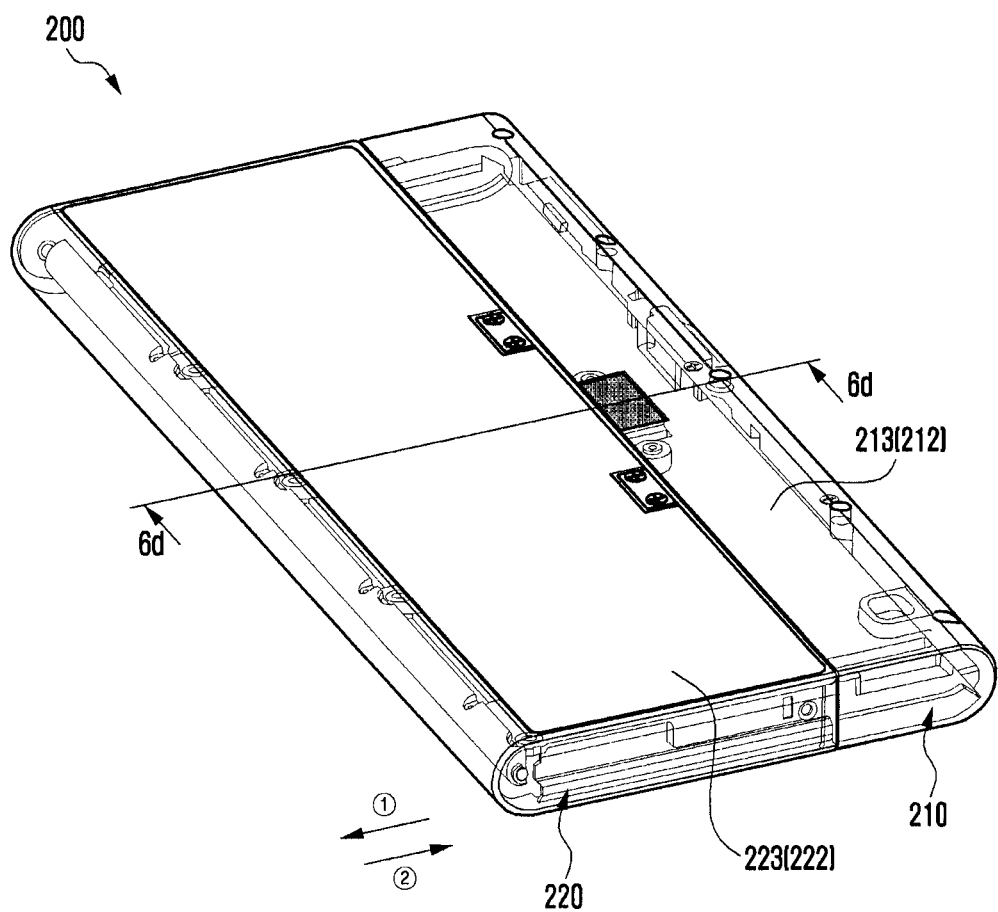
FIG. 6B is a rear side perspective view of an electronic device, illustrating an arrangement configuration of a lock according to certain embodiments.
Figure 6C:
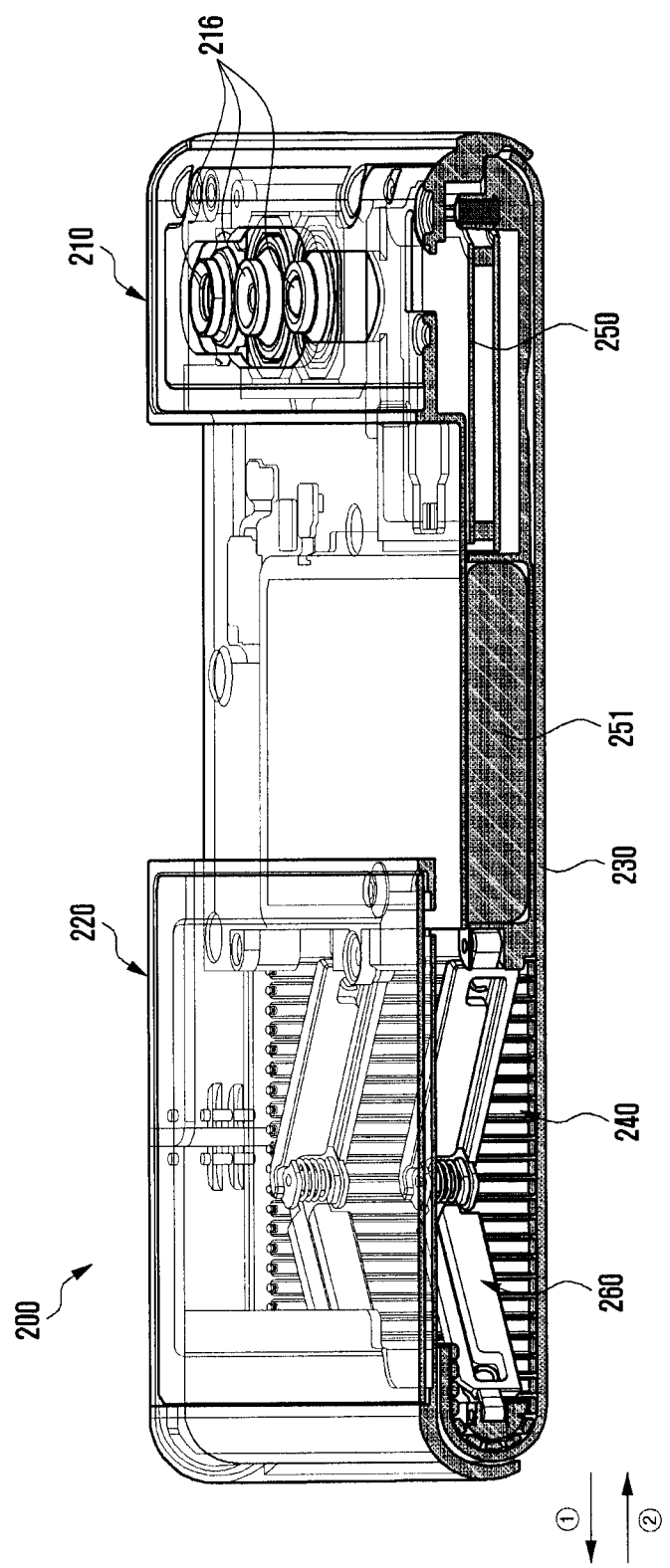
FIG. 6C is a cross-sectional view of the electronic device according to certain embodiments, taken along line 6c-6c in FIG. 6A.

FIG. 6A is a view illustrating the configuration of an electronic device including a support assembly according to certain embodiments. FIG. 6B is a rear side perspective view of an electronic device, illustrating the arrangement configuration of a lock according to certain embodiments. FIG. 6C is a cross-sectional view of the electronic device according to certain embodiments, taken along line 6c-6c in FIG. 6A.

Referring to FIGS. 6A to 6C, the electronic device 200 may include a support assembly 260 fixed to the first housing 210 and disposed so as to be physically expandable in the first direction ①, thereby expanding the second space 2201. The support assembly 260 may be fixed to an end of the second bracket housing 210b of the first housing 210, and may be disposed so as to press the bendable member 240 via multiple links, e.g., first link 262 and second link 263 that operate to be expandable via an elastic member 264 and a pressing member 265. In this case, by being disposed so as to be at least partially in contact with the rear surface of the bendable member 240, the multiple links 262 and 263 are capable of preventing the flexible display 230 from sagging into the second space 230 during the shifting from the slid-in state to the slid-out state and capable of always maintaining the flat surface of the flexible display 230, thereby helping to improve the surface quality of the flexible display 230. In addition, the coupling structure of the support assembly 260 that presses the second housing 220 in the slid-out state may provide a support function for an external force in the slid-out state.

Figure 6D:
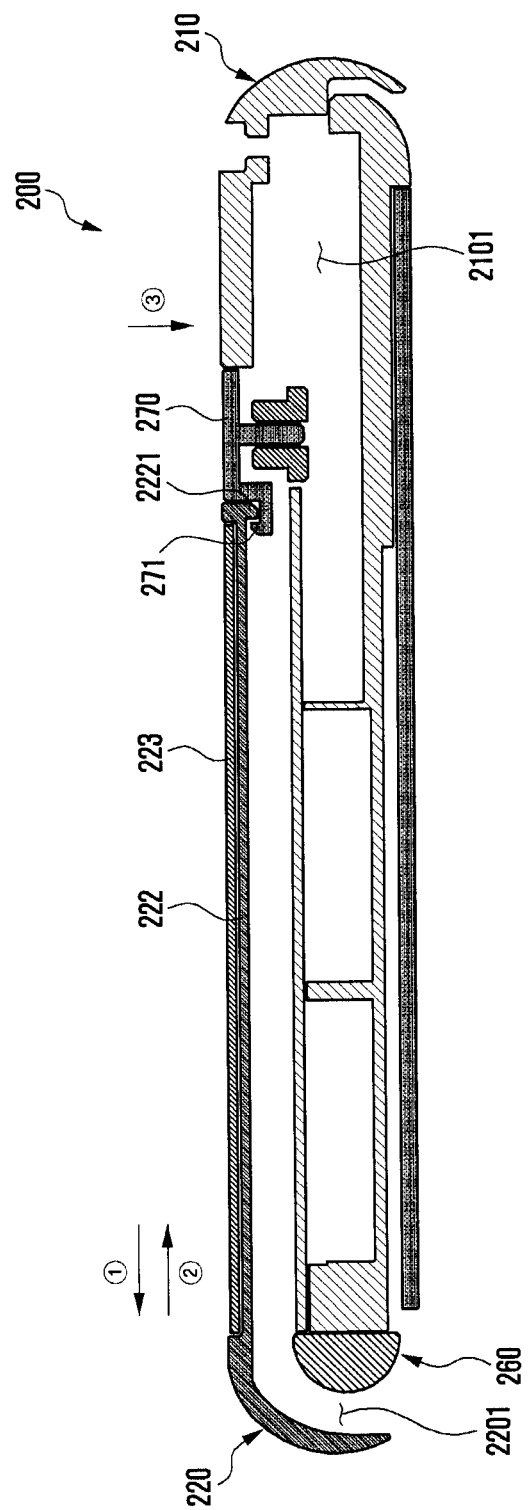
FIG. 6D is a cross-sectional view of the electronic device according to certain embodiments taken along line 6d-6d in FIG. 6B.

FIG. 6D is a cross-sectional view of the electronic device according to certain embodiments taken along line 6d-6d in FIG. 6B.

Referring to FIG. 6D, the electronic device 200 may be induced to maintain the slid-out state via the pressing structure of the bendable member 240 by the support assembly 260. Accordingly, the electronic device 200 may include a regulation structure for continuously maintaining the slid-in state while holding the pressing force by the support assembly 260. According to an embodiment, as the regulation structure, the electronic device 200 may include a lock 270 disposed in the first housing 210 to be movable, and an engagement step 2221 provided in the second housing 220 so as to be engaged with the lock 270. According to an embodiment, the lock 270 may be pressed from the rear surface of the first housing 210 (e.g., the rear surface 200b in FIG. 2B) in a third direction (direction ③) perpendicular to a first direction in which the second housing 220 is slid out (direction ①) and a second direction in which the second housing 220 is slid in (direction ②). According to an embodiment, the lock 270 may include a hook 271 formed at an end thereof. Accordingly, in the electronic device 200, by causing the hook 271 of the lock 270 to be engaged with the engagement step 2221 of the second housing 220 while the pressing force applied in the first direction (direction ①) via the support assembly 260 is maintained, the slid-in state can be continuously maintained. According to an embodiment, when the lock 270 is pressed in the third direction (direction ③) through the user's manipulation, the engagement step 2221 is released from the hooking structure 271, and the second housing 220 moves in the first direction (direction ①) by the pressing force of the support assembly 260, the electronic device 200 may be shifted to the slid-out state.

Figure 7A:
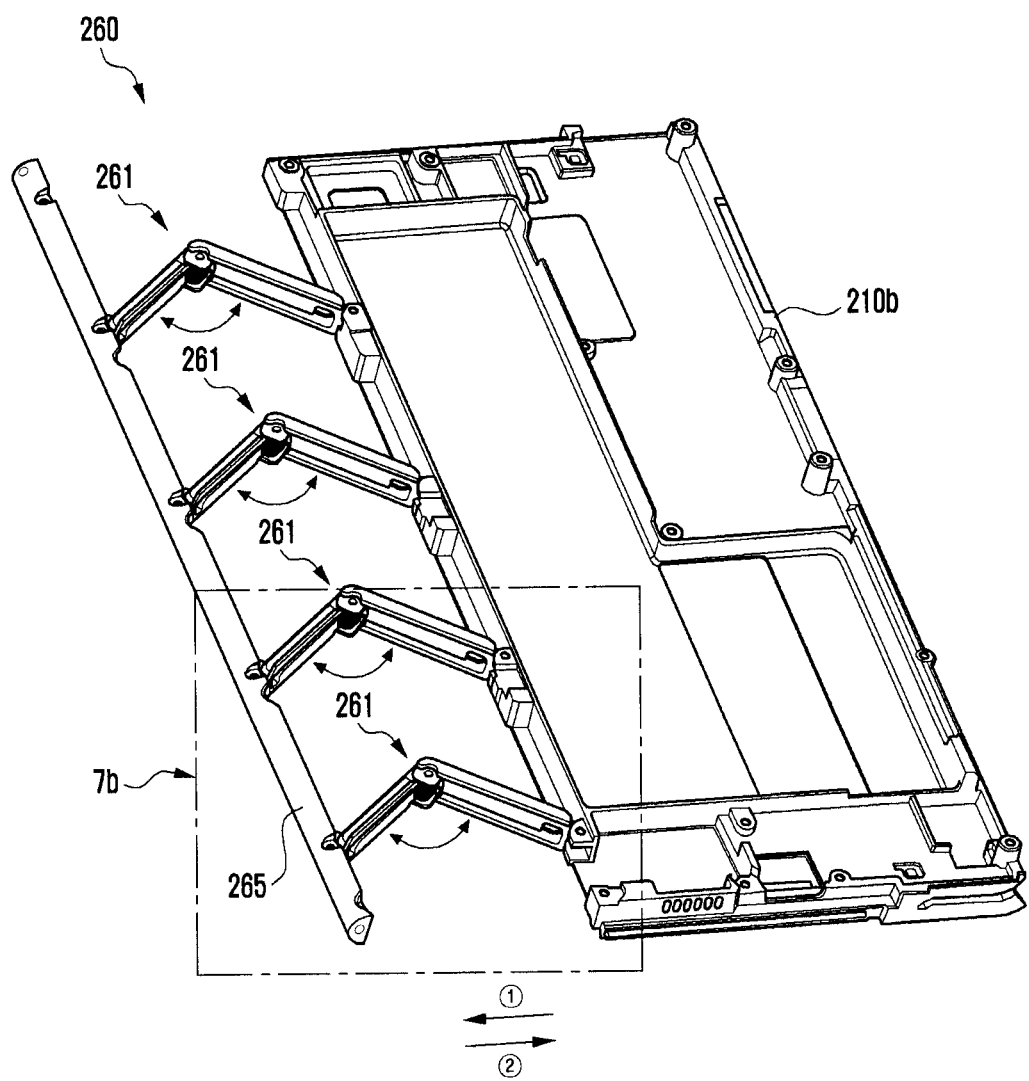
FIG. 7A is a perspective view illustrating the state in which a support assembly is coupled to a bracket housing according to certain embodiments.
Figure 7B:
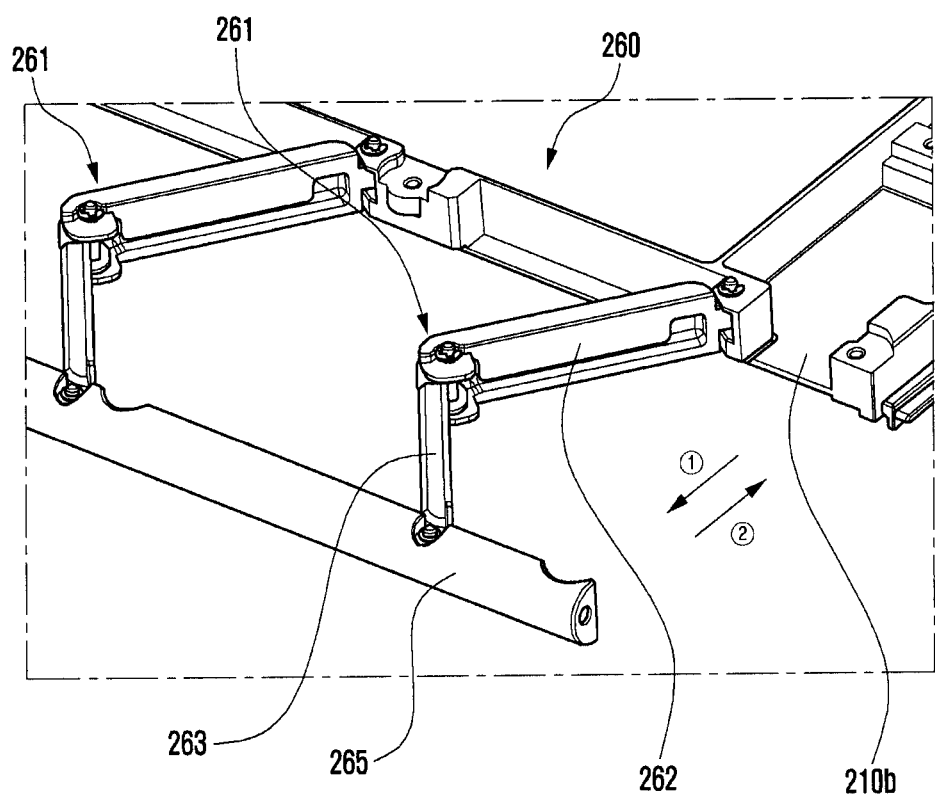
FIG. 7B is an enlarged view of the area 7b in FIG. 7A according to certain embodiments.

FIG. 7A is a perspective view illustrating the state in which a support assembly is coupled to a bracket housing according to certain embodiments. FIG. 7B is an enlarged view of the area 7b in FIG. 7A according to certain embodiments.

Referring to FIGS. 7A and 7B, the support assembly 260 may include one or more support structures 261 movably fixed to the second bracket housing 210b and pressed in the direction in which the second housing 220 is slid out (direction ①), and a pressing member 265 movably fixed to the one or more support structures 261 and configured to press a bendable member (e.g., the bendable member 240 in FIG. 6A) in a contact manner. Multiple support structures 261 may be disposed at predetermined intervals in the first bracket housing 210b. The multiple support structures 261 may be configured to at least partially have different shapes and/or functions. In some embodiments, the multiple support structures 261 may be disposed at substantially the regular or irregular intervals. The pressing member 265 may be simultaneously connected to the multiple support structures 261. The pressing member 265 may be disposed to press the bent portion of the bendable member 240 in the second space (e.g., the second space 2201 in FIG. 5). Accordingly, the pressing member 265 may have a curved surface that is brought into contact with the rear surface of the bendable member 240. The pressing member may be formed of a metal material and/or a polymer. In some embodiments, the pressing member 265 may include rollers movably coupled to the multiple support structures 261, respectively.

According to certain embodiments, at least one support structure 261 may include a first link 262 rotatably coupled to the first bracket housing 210b, and a second link 263 rotatably coupled to the first link 262, and an elastic member (e.g., the elastic member 264 in FIG. 8A) that urges the first link 262 and the second link 263 in the unfolding direction. The pressing member 265 may be movably coupled to the second link 263. In the folded state (e.g., the slid-in state), the first link 262 and the second link 263 may be disposed so as to be close to or to be at least partially in contact with the second bracket housing 210b. In the unfolded state (e.g., the slid-out state), the first link 262 and the second link 263 may be unfolded from each other by a predetermined angle (e.g., the angle θ in FIG. 8A), and may expand from the second bracket housing 210b toward the second space (direction ①).

Links and Elastic Member

The support assemblies can comprises a first link 262 connected to a second link 263 by an elastic member 264. The elastic member 264 provides a force urging first link 262 to separate from the second link 263 at a particular angle.

Figure 8A:
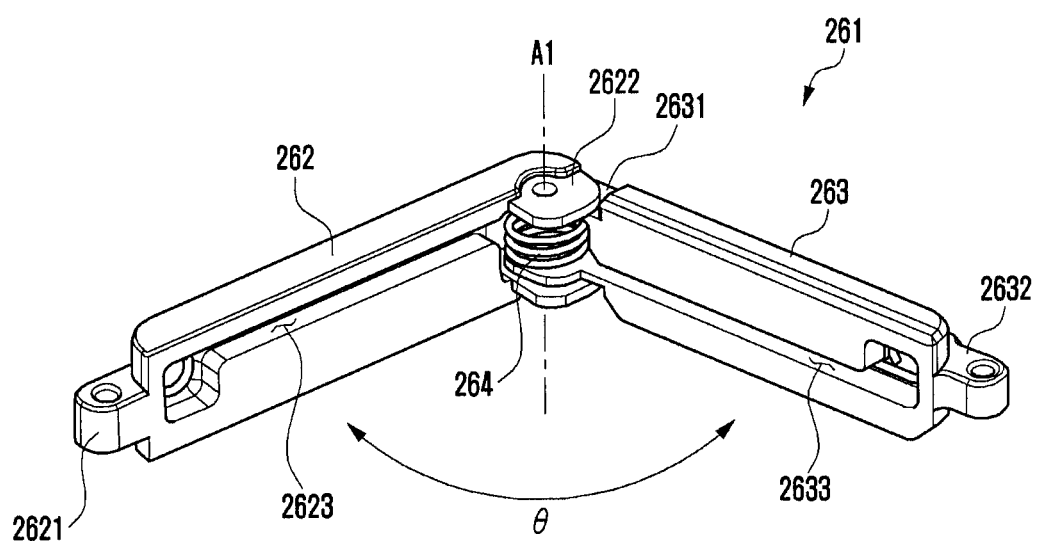
FIG. 8A is a perspective view illustrating a support structure in the state in which two links according to certain embodiments are unfolded by a predetermined angle.
Figure 8B:
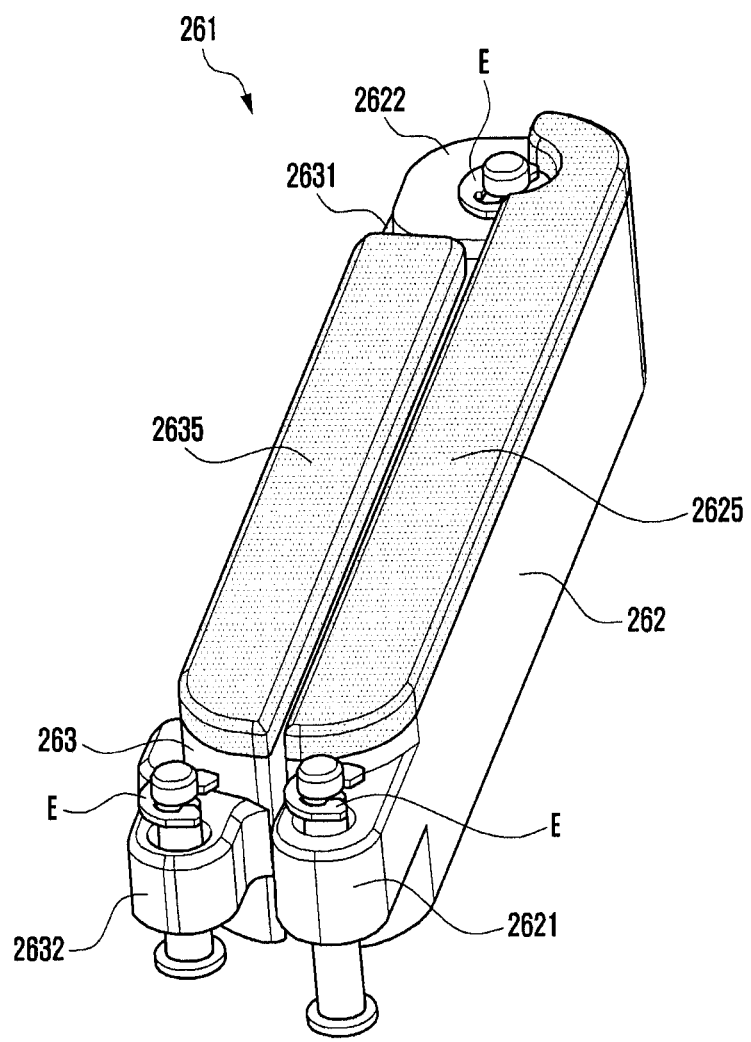
FIG. 8B is a perspective view illustrating a support structure in the state in which two links according to certain embodiments are folded.
Figure 8C:
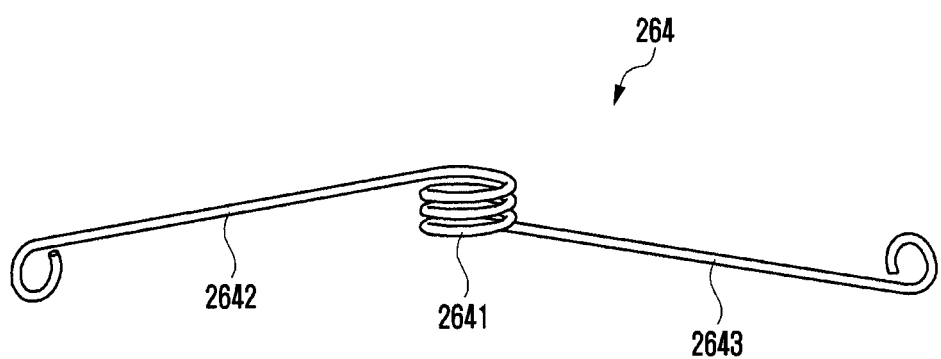
FIG. 8C is a perspective view illustrating an elastic member according to certain embodiments.

FIG. 8A is a perspective view illustrating a support structure in the state in which two links according to certain embodiments are unfolded by a predetermined angle. FIG. 8B is a perspective view illustrating a support structure in the state in which two links according to certain embodiments are folded. FIG. 8C is a perspective view illustrating an elastic member according to certain embodiments.

Referring to FIGS. 8A to 8C, the support structure 261 may include a first link 262 having a predetermined length and including a first hinge arm 2621 and a second hinge arm 2622 at opposite ends thereof, a second link 263 having a predetermined length and including a third hinge arm 2621 and a fourth hinge arm 2622 at opposite ends thereof, and an elastic member 264 disposed between the first link 262 and the second link 263 and configured to press the first link 262 and the second link 263 to unfold by a predetermined angle θ. According to an embodiment, the first hinge arm 2621 and the second hinge arm 2622 may be integrally formed with the first link 262. According to an embodiment, the third hinge arm 2631 and the fourth hinge arm 2632 may be integrally formed with the second link 263. According to an embodiment, the predetermined angle θ may be determined within a range of less than 180 degrees in order to induce a smooth folding operation of the first link 262 and the second link 263. According to an embodiment, the first link 262 and the second link 263 may be formed of a metal material and/or a polymer. According to an embodiment, the first link 262 may be disposed so as to rotatably couple the first hinge arm 2621 to the second bracket housing (e.g., the second bracket housing 210b in FIG. 7A), and the second link 263 may be disposed so as to rotatably couple the third hinge arm 2631 to the second hinge arm 2622. According to an embodiment, the pressing member (e.g., the pressing member 265 in FIG. 7A) may be rotatably coupled to the fourth hinge arm 2632 of the second link 263. Respective hinge arms 2621, 2622, 2631, and 2632 may be rotatably coupled via an E ring. According to an embodiment, the first link 262 and the second link 263 may include first friction reduction members 2625 and 2635, respectively, which are disposed on a portion that comes into contact with and support the bendable member 240. According to an embodiment, the first friction reduction members 2625 and 2635 may include at least one of a POM layer, an acetal layer, or a Teflon layer. Therefore, when the first link 262 and/or the second link 263 are in contact with the bendable member 240, friction with the bendable member 240 is reduced via the first friction reduction members 2625 and 2635, which may be helpful for performing a smooth sliding operation of the electronic device 200.

According to certain embodiments, the elastic member 264 is a torsion spring, and may include a fixing portion 2641 fixed to a rotation axis A1 formed by the second hinge arm 2262 of the first link 262 and the third hinge arm 2631 of the second link 263, and a first free end 2642 and a second free end 243, which extend toward the first link 262 and the second link 263 from opposite ends of the fixing portion 2641, respectively. According to an embodiment, the first free end 2642 is accommodated in a first spring accommodation groove 2623 provided in the first link 262, the second free end 2643 is accommodated in a second spring accommodation groove 2633 provided in the second link 263, and the first and second free ends 2642 and 2643 are disposed so as not to protrude to the outside, which may be helpful for the operation of the links 262 and 263.

Figure 8D:
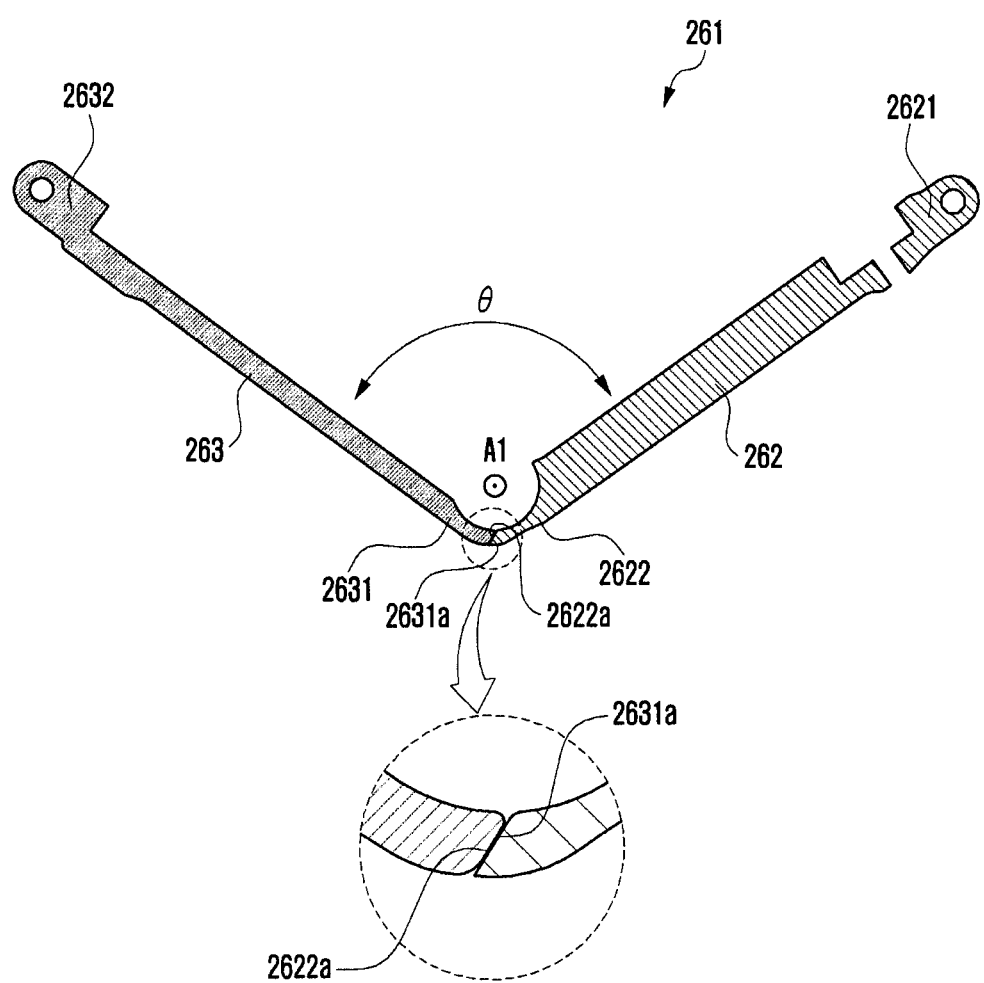
FIG. 8D is a schematic view of a support member, illustrating an angle regulation structure for regulating the unfolding angle between two links according to certain embodiments.

FIG. 8D is a schematic view of a support member, illustrating an angle regulation structure for regulating the unfolding angle between two links according to certain embodiments.

Referring to FIG. 8D, the support structure may include an angle regulation structure provided on the first link 262 and the second link 263 and configured to regulate the unfolding angle θ between the two links 262 and 263. According to an embodiment, the angle regulation structure may include a first engagement portion 2622a provided in the second hinge arm 2262 of the first link 262 and a second engagement portion 2631a provided in the third hinge arm 2631 of the second link 263. According to an embodiment, the first engagement portion 2262a and the second engagement portion 2631a may have shapes for determining the predetermined unfolding angle θ between the two links 262 and 263 about the rotation axis A1 by an elastic member 264. For example, the first link 262 and the second link 263 may be prevented from being further unfolded beyond the predetermined angle by the structure in which the first engagement portion 2622a and the second engagement portion 2631a are brought into contact with each other while the first link 262 and the second link 263 are unfolded from each other about the rotation axis A1 by the elastic member 264.

Figure 9:
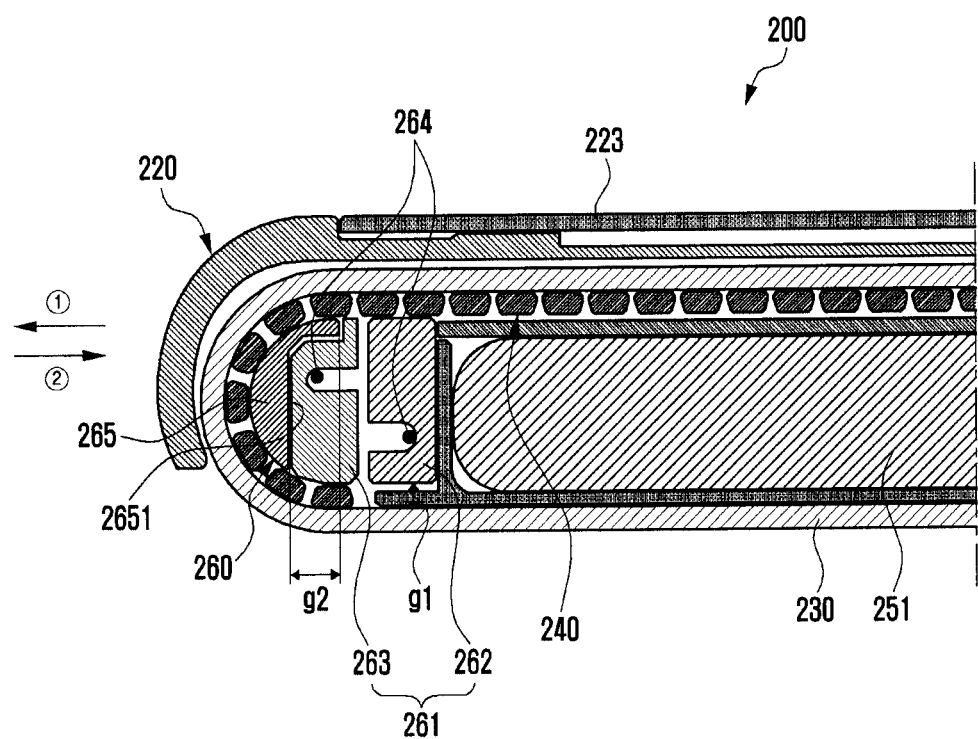
FIG. 9 is a cross-sectional view illustrating a portion of an electronic device including a support assembly according to certain embodiments in a slid-in state.

FIG. 9 is a cross-sectional view illustrating a portion of an electronic device including a support assembly according to certain embodiments in a slid-in state.

Referring to FIG. 9, the electronic device 200 may include an arrangement structure that is capable of being helpful for slimming down the electronic device 200 by reducing the volume of the support assembly 260 in the slid-in state. In the slid-out state, the first link 262 and the second link 263 may be arranged to have a gap g1 for accommodating the bendable member 240, which at least partially supports the flexible display 230. The gap g1 may include a space provided between the flexible display 230 and the links 262 and 263. According to an embodiment, the pressing member 265 may include a recess 2651 having a predetermined accommodation depth g2 provided at a corresponding position in order to accommodate at least a portion of the second link 263 folded to the first link 262 in the slid-in state. The electronic device 200 may be slimmed with the help of the accommodation structure of the second link 263 which is at least partially accommodated in the recess 2651 in the pressing member 265 in the slid-in state.

Bendable Member

The bendable member 240 comprises multiple bars 241 that are rotatably connected to each other. As a result, the bendable member 240 can roll outwards when the electronic device 200 is in the slid-out state, and can roll inwards when the electronic device 200 is in the slid-in state.

Figure 10A:
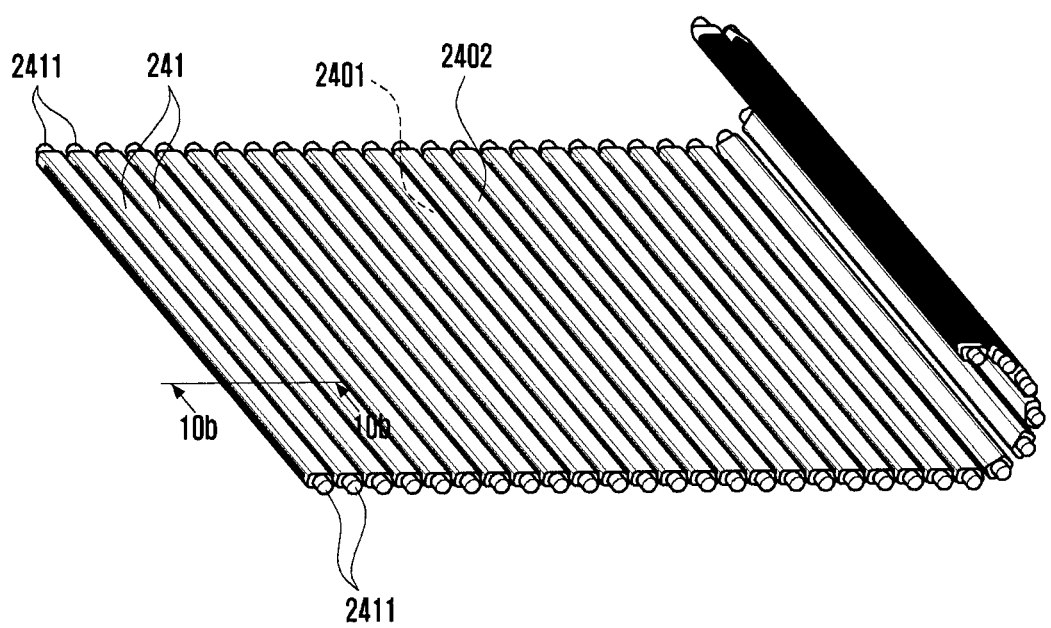
FIG. 10A is a perspective view illustrating a bendable member according to certain embodiments.
Figure 10B:
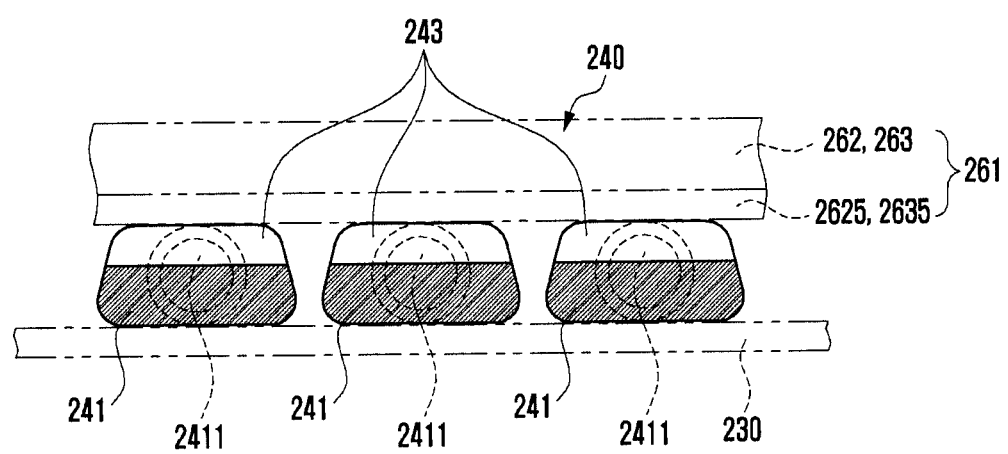
FIG. 10B is a partial cross-sectional view of a bendable member according to certain embodiments taken along line 10b-10b in FIG. 10A.

FIG. 10A is a perspective view illustrating a bendable member according to certain embodiments. FIG. 10B is a partial cross-sectional view of a bendable member according to certain embodiments taken along line 10b-10b in FIG. 10A.

Referring to FIGS. 10A and 10B, the bendable member 240 may include multiple bars 241, which are rotatably connected to each other. According to an embodiment, the bendable member 240 may include a top surface 2401 by the multiple bars 241 and a rear surface 2402 facing away from the top surface 2401. According to an embodiment, the top surface 2401 may face a flexible display 230, and the rear surface 2402 may face the internal space of the electronic device 200 (e.g., the first internal space 2101 and/or the second internal space 2201 in FIG. 5). According to an embodiment, the multiple bars 241 may be formed of a metal material and/or a polymer. Each of the multiple bars 241 may include guide protrusions 2411 protruding at opposite ends thereof to be guided along a guide structure (e.g., the guide rails 242 in FIG. 4) disposed in the first housing 210 and/or the second housing 210 in the internal space of the electronic device 200.

According to certain embodiments, each of the multiple bars 241 may include a second friction reduction structure 243. According to an embodiment, the second friction reduction structure 243 may be disposed on the rear surface 2402 of the bendable member 240, which faces the support structure 261 of the support assembly (e.g., the support assembly 260 in FIG. 7A). According to an embodiment, the second friction reduction structure 243 may also include at least one of a POM layer, an acetal layer, or a Teflon layer disposed on each of the multiple bars 241. Therefore, when the bendable member 240 is supported by the support structure 261 of the support assembly 260, the first friction reduction members 2625 and 2635 disposed on the first links (e.g., the first link 262 in FIG. 8B) and/or the second links (e.g., the second link 263 in FIG. 8B) and the second friction reduction structure 243 disposed on the bendable member 240 are brought into contact with each other, whereby the frictional resistance between the first links 262 and/or the second links 263 and the bendable member 240 according to the sliding operation can be reduced.

Pressing Member

Figure 11:
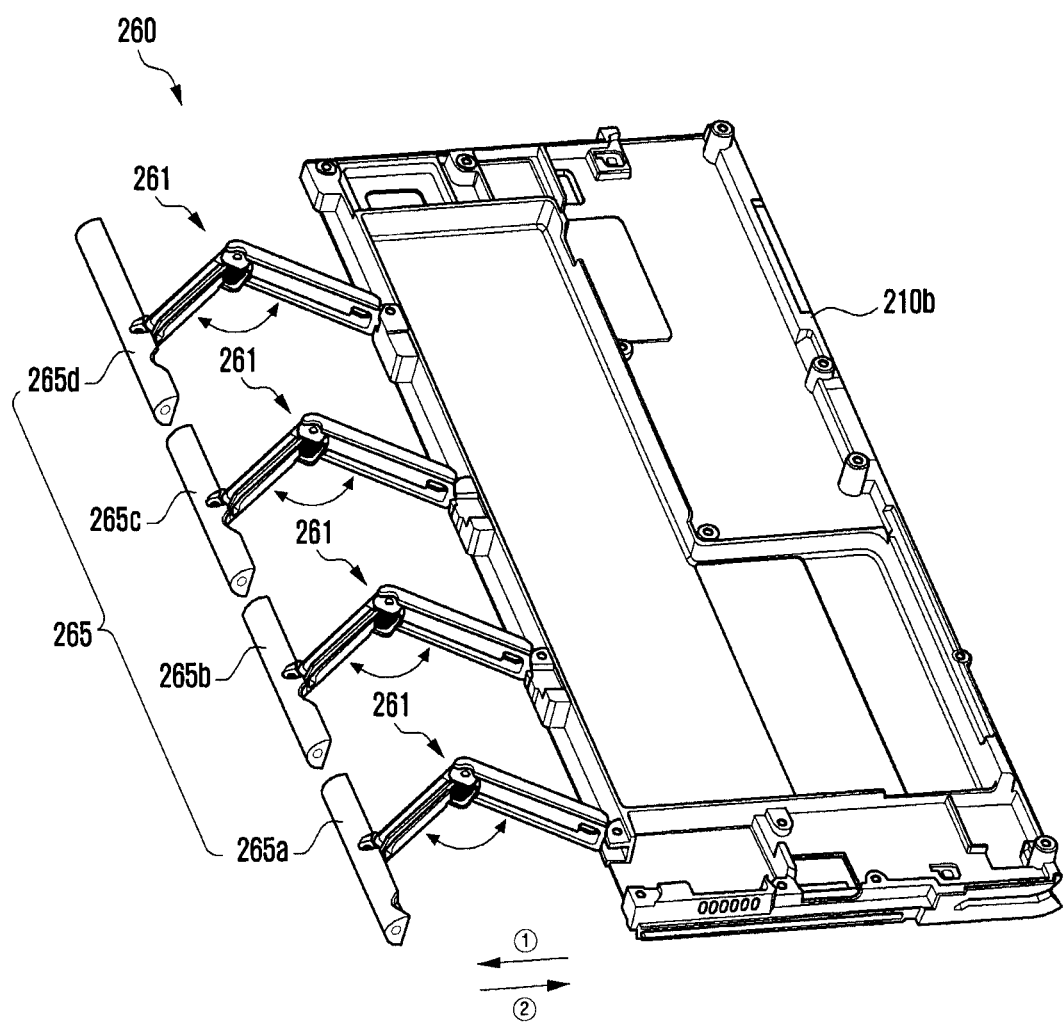
FIG. 11 is a perspective view illustrating the state in which a support assembly is coupled to a bracket housing according to certain embodiments.

FIG. 11 is a perspective view illustrating the state in which a support assembly is coupled to a bracket housing according to certain embodiments.

In describing the support assembly 260 of FIG. 11, the components that are substantially the same as those of the support assembly 260 of FIG. 7A are denoted by the same reference numerals, and a detailed description thereof may be omitted.

Referring to FIG. 11, the support assembly 260 may include support structures 261 movably fixed to the second bracket housing 210b and pressed in the direction in which the second housing 220 is slid out (direction ①), and a pressing member 265 movably fixed to the support structures 261 and configured to press a bendable member (e.g., the bendable member 240 in FIG. 6A) in a contact manner. According to an exemplary embodiment, the pressing member 265 may include multiple pressing members 265a, 265b, 265c, and 265d coupled to correspond to the support members 261, respectively.

Figure 12:
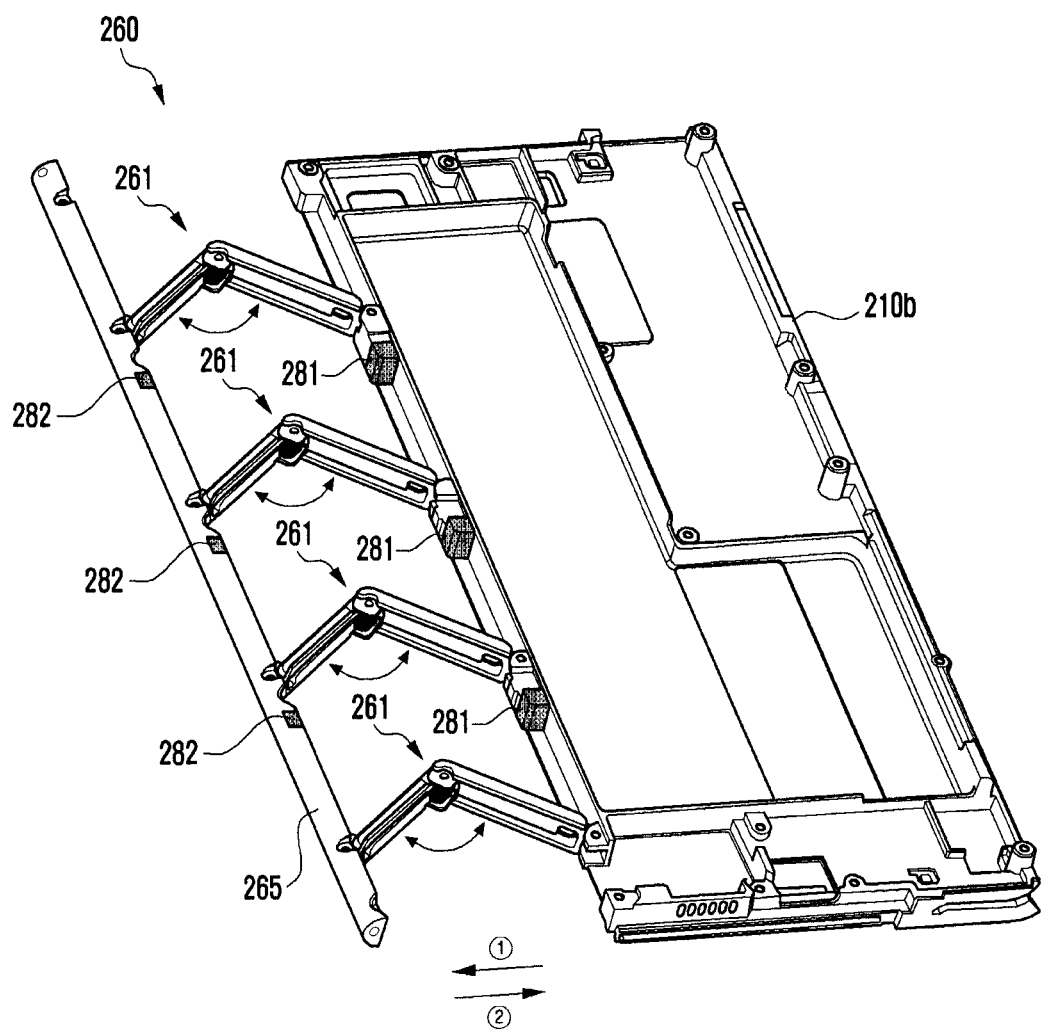
FIG. 12 is a perspective view illustrating a slid-out prevention structure of a second housing provided between a support assembly and a bracket housing according to certain embodiments.

FIG. 12 is a perspective view illustrating a slid-out prevention structure of a second housing provided between a support assembly and a bracket housing according to certain embodiments;

In describing the support assembly 260 of FIG. 12, the components that are substantially the same as those of the support assembly 260 of FIG. 7A are denoted by the same reference numerals, and a detailed description thereof may be omitted.

Referring to FIG. 12, the support assembly 260 may include support structures 261 movably fixed to the second bracket housing 210b and pressed in the direction in which the second housing 220 is slid out (direction ①), and a pressing member 265 movably fixed to the support structures 261 and configured to press a bendable member (e.g., the bendable member 240 in FIG. 6A) in a contact manner. According to an embodiment, the electronic device 200 may include a slid-out prevention structure disposed between the support assembly 260 and the second bracket housing 210b so as to maintain the slid-in state of the second housing 220. According to an embodiment, the slid-out prevention structure may be replaced with the regulation structure of the second housing (e.g., the second housing 220 in FIG. 6D) using a lock (e.g., the lock 270 in FIG. 6D).

According to certain embodiments, the slid-out prevention structure may include at least one first magnet 281 disposed in the second bracket housing 210d and at least one second magnet 282 disposed at a corresponding position of the pressing member 265 at which the at least one second magnet 282 is affected by the magnetic force of the at least one first magnet 281 in the slid-in state. According to an embodiment, the first magnet 281 and the second magnet 282 may be arranged such that an attractive force acts therebetween in the slid-in state. According to an embodiment, the attractive force between the first magnet 281 and the second magnet 282 may be set to the strength of magnetic force capable of overcoming the force applied when the support structures 261 are to be unfolded from the slid-in state. Accordingly, when the electronic device 200 is shifted from the slid-out state to the slid-in state by the user, the slid-in state may be maintained by the attractive force between the first magnet 281 and the second magnet 282. Meanwhile, when the electronic device 200 is pressed with a force greater than the attractive force between the two magnets 281 and 282 along the direction in which the flexible display 230 is slid out by the user from the slid-in state, the attractive force applied by the two magnets 281 and 282 can be released, and the electronic device 200 can be shifted to the slid-out state by the pressing force applied when the support structures 261 are to be unfolded. In some embodiments, the second magnet 282 may be disposed in at least a portion of the support structure 261. In some embodiments, the first magnet 281 and/or the second magnet 282 may be replaced with an electromagnet.

Component Assembly

Figure 13:
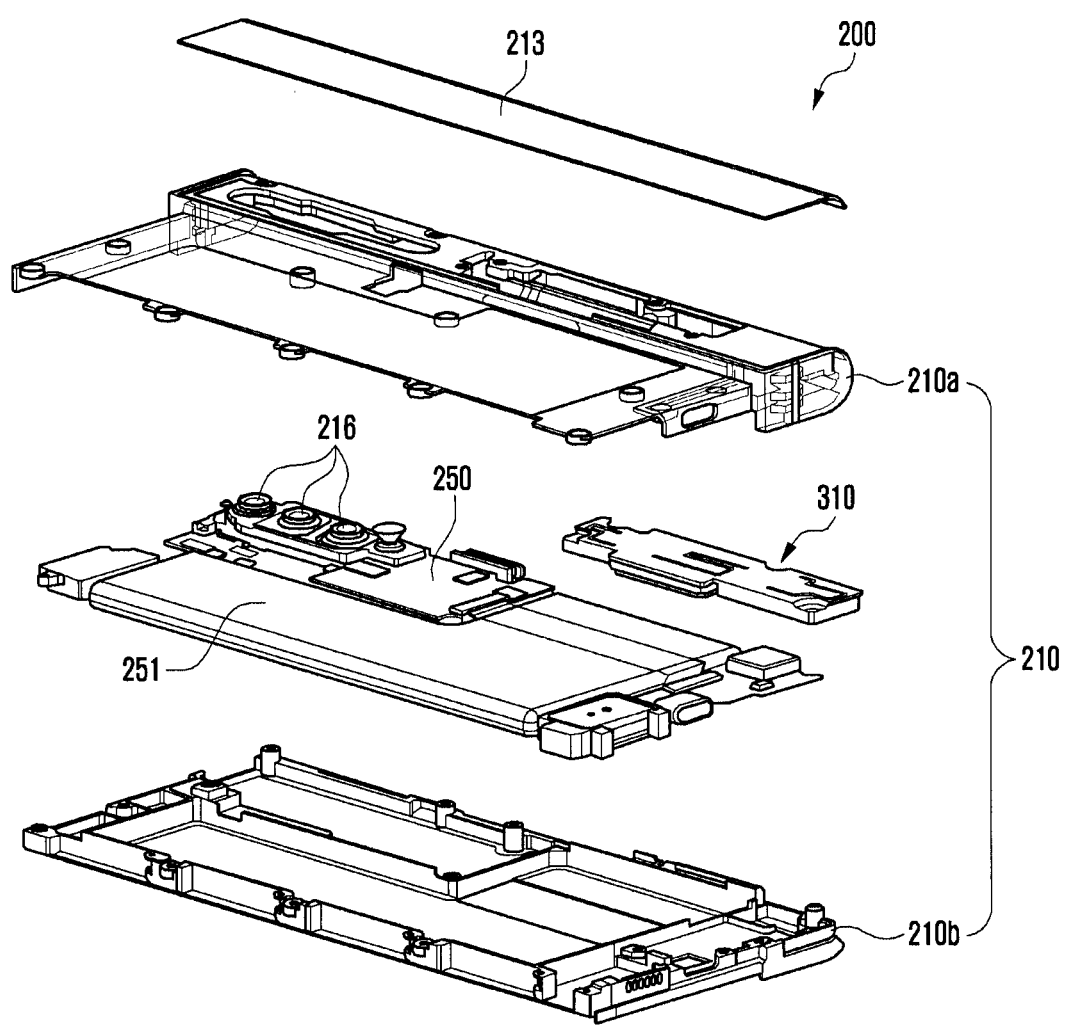
FIG. 13 is an exploded perspective view illustrating an electronic device including a component assembly according to certain embodiments.

FIG. 13 is an exploded perspective view illustrating an electronic device including a component assembly according to certain embodiments.

Referring to FIG. 13, the electronic device 200 may include a first housing 210 and a second housing (e.g., the second housing 220 in FIG. 14A), which is coupled to be slidable by a designated reciprocating distance. According to an embodiment, the first housing 210 may include a first bracket housing 210a and a second bracket housing 210b coupled to the first bracket housing 210a. According to an embodiment, the first housing 210 may include a first space (e.g., the first space 2101 in FIG. 17) provided by coupling the first bracket housing 210a and the second bracket housing 210b. According to an embodiment, the first housing 210 may include at least one electronic component disposed in the first space 2101. According to an embodiment, the at least one electronic component may include a main board 250, a camera module 216 disposed on the main board 250, a battery 251 disposed near the main board 250, and a component assembly 310. According to an embodiment, the component assembly 310 may be configured as a single assembly by arranging at least two electronic components (e.g., an antenna module 312 and a socket module 313 in FIG. 15) to be stacked on each other. According to an embodiment, at least one first electronic component included in the component assembly 310 may perform a corresponding function in the first space 2101 of the first housing 210. According to an embodiment, at least one second electronic component included in the component assembly 310 may be disposed to face the outside through at least one opening (e.g., the opening 212d in FIG. 14B) provided in the first housing 210. According to an embodiment, the at least one first electronic component may perform a corresponding function in the first space 2101 regardless of the opening. For example, the at least one first electronic component may include an antenna module (e.g., the antenna module 312 of FIG. 15). According to an embodiment, the at least one second electronic component may include at least one of the speaker module (e.g., the speaker 207 in FIG. 18A), a microphone module (e.g., the microphone 203 in FIG. 18A), a sensor module (e.g., the sensor module 217 in FIG. 3A), a socket module (e.g., the socket module 313 in FIG. 15), and a connector port (e.g., the connector port 208 of FIG. 18A), each of which faces the outside of the electronic device 200 through an opening (e.g., the opening 212d in FIG. 14B) so as to perform a corresponding function.

Figure 14A:
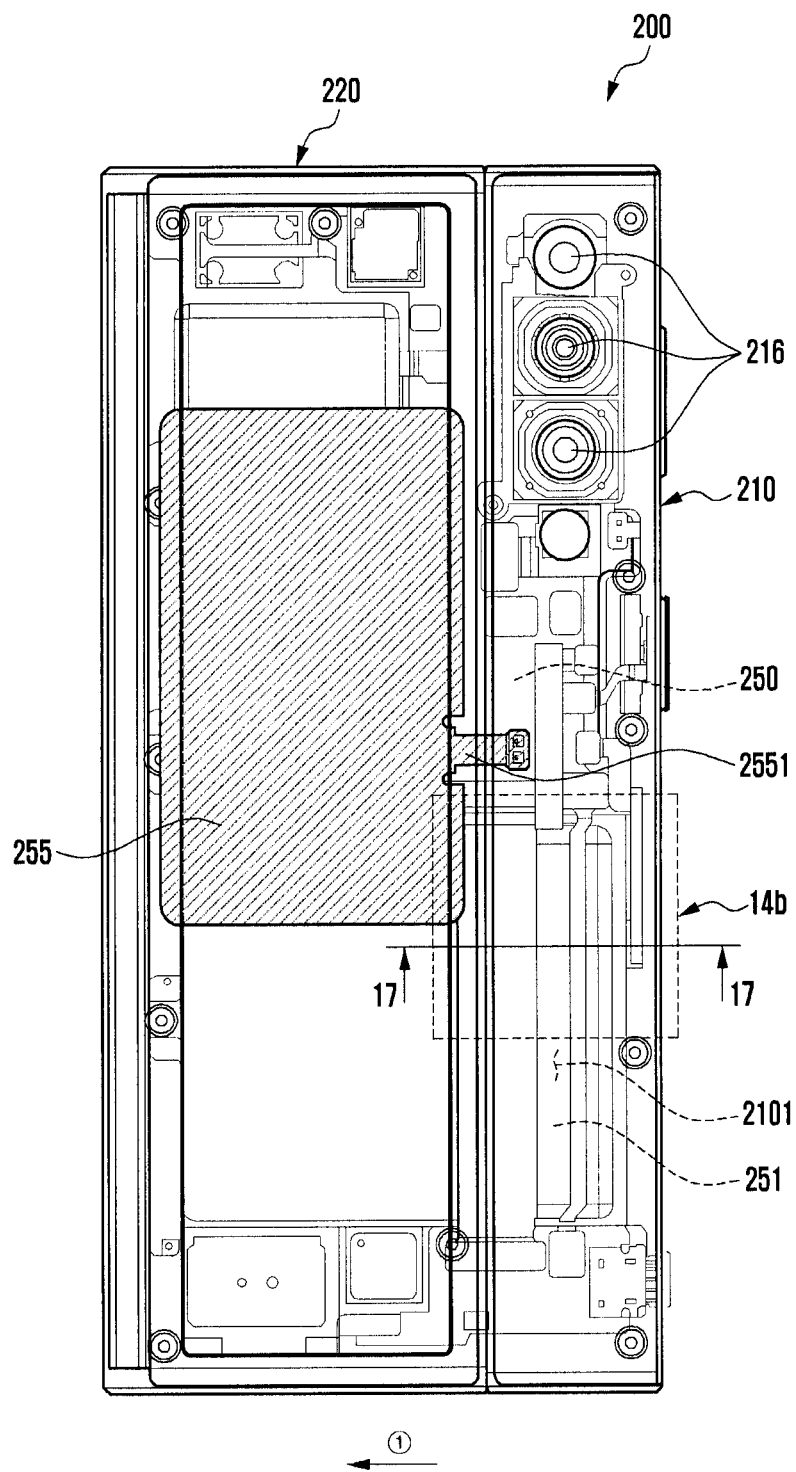
FIG. 14A is a plan view illustrating the rear surface of an electronic device according to certain embodiments in which a component assembly is arranged.
Figure 14B:
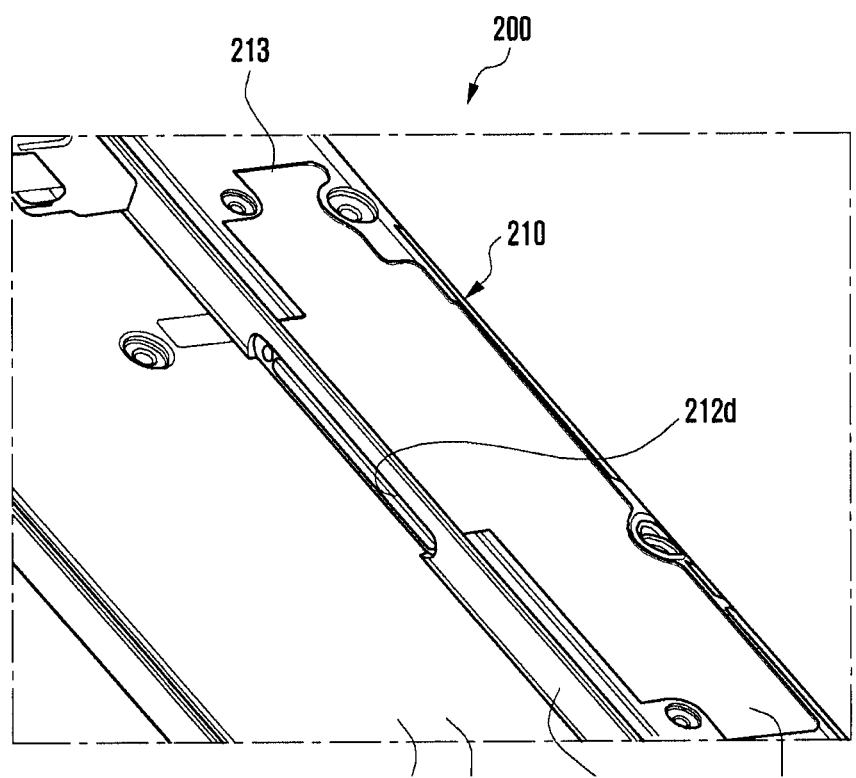
FIG. 14B is an enlarged view of the area 14b in FIG. 14A according to certain embodiments.

FIG. 14A is a plan view illustrating the rear surface of an electronic device according to certain embodiments in which a component assembly is arranged. FIG. 14B is an enlarged perspective view of a portion of the area 14b in FIG. 14A according to certain embodiments.

Figure 17:
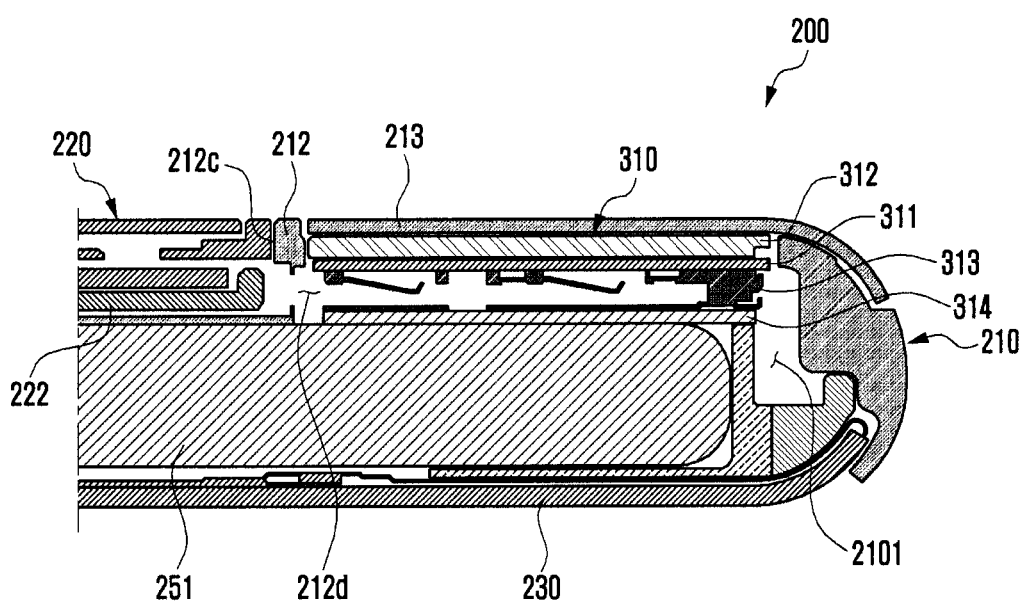
FIG. 17 is a cross-sectional view of an electronic device according to certain embodiments taken along line 17-17 in FIG. 14.

Referring to FIGS. 14A and 14B, the electronic device 200 may include a first housing 210 including a first space (e.g., the first space 2101 in FIG. 17) and a second housing 220, which is disposed so as to be slidable by a predetermined reciprocating distance from the first housing 210 and includes a second space (e.g., the second space 2201 in FIG. 17). According to an embodiment, the first housing 210 may include a first support member 212 at least a portion of which extends into the first space 2101. According to an embodiment, the second housing 220 may include a second support member (e.g., the second support member 222 in FIG. 17) extending into the second space 2201. According to an embodiment, the first support member 212 may include a non-overlapping portion 212a extending from the non-overlapping portion 212a and disposed so as to be visible from the outside in the slid-in state, an overlapping portion 212b disposed so as to be invisible from the outside by being disposed so as to overlap at least a portion of the second support member 220, and a stepped portion 212c connecting the non-overlapping portion 212a and the overlapping portion 212b to each other. According to an embodiment, in the slid-in state, the stepped portion 212c may be covered so as to be invisible from the outside through the second support member 222. In some embodiments, the rear surface (e.g., the rear surface 200b in FIG. 3A) of the electronic device 200 may form a substantially flat surface when the second support member 222 is connected to the first support member 212a via the stepped portion 212c.

According to certain embodiments, the electronic device 200 may include an opening 212d disposed in the stepped portion 212c of the first support member 212 of the first housing 210 and connects the first space 2101 to the outside. According to an embodiment, in the slid-out state, the opening 212d may face the outside, and in the slid-in state, the opening 212d may be closed by the second support member 222 so as to be disconnected from the outside. According to an embodiment, at least some electronic components (e.g., a socket module) of the component assembly (e.g., the component assembly 310 in FIG. 13) disposed in the first space 2101 of the first housing 210 may be disposed to be connected to the opened 212d. Accordingly, some electronic components included in the component assembly 310 may perform functions related to the outside of the electronic device 200 while the electronic device 200 is in the slid-out state. For example, when some electronic components included in the component assembly 310 include a socket module (e.g., the socket module 313 in FIG. 15), an external card member (e.g., a SIM card or a memory card) may be mounted on or removed from the socket module 313 through the opening 212d while the electronic device 200 is in the slid-out state. According to an embodiment, while the electronic device 200 is in the slid-in state, the opening 212d is covered by the second support member 222 so as to be invisible from the outside, which may be helpful for improving the aesthetics of the electronic device 200.

Figure 15:
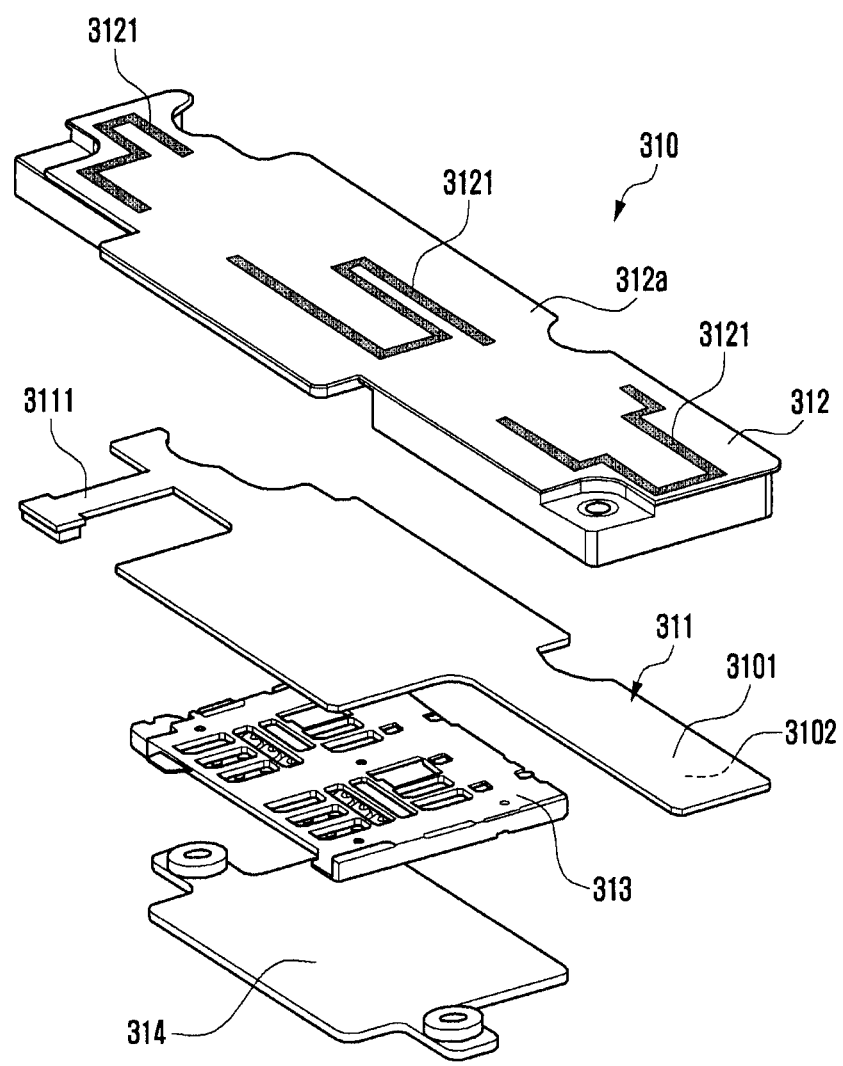
FIG. 15 is an exploded perspective view of a component assembly according to certain embodiments.
Figure 16:
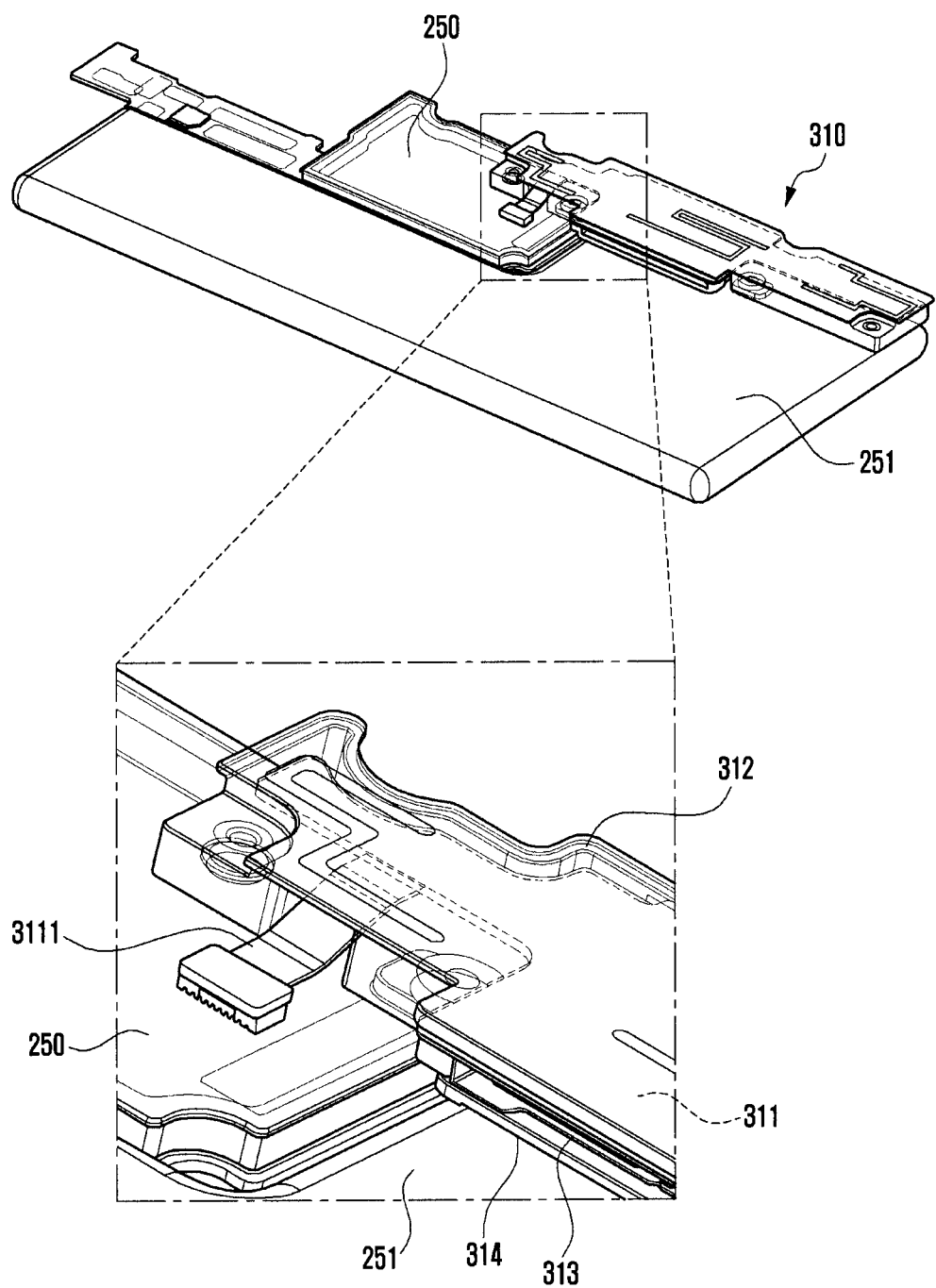
FIG. 16 is a perspective view illustrating the state in which the component assembly according to certain embodiments is connected to a main board.

FIG. 15 is an exploded perspective view of a component assembly according to certain embodiments. FIG. 16 is a perspective view illustrating the state in which the component assembly according to certain embodiments is connected to a main board.

Referring to FIGS. 15 and 16, the component assembly 310 may include a board including a first board surface 3101, a second board surface 3102 facing away from the first board surface 3101, an antenna module 312 as a first electronic component disposed on the first board surface 3101, and a socket module 313 as a second electronic component disposed on the second board surface 3102. According to an embodiment, the board 311 may be electrically connected to the main board 250 via an extension (e.g., an FPCB) that is drawn out or extends from the board 311.

According to certain embodiments, the antenna module 312 may include a dielectric structure 312a (e.g., an antenna carrier) disposed on the first board surface 3101 and at least one conductive pattern 3121 (e.g., an antenna pattern) disposed on the dielectric structure 312a. The at least one conductive pattern 3121 may be set to transmit and/or receive a wireless signal in a predetermined frequency band via a wireless communication circuit (e.g., the wireless communication module 192 in FIG. 1) disposed in the first space of the first housing 210 (e.g., the first space 2101 in FIG. 17). According to an embodiment, the conductive pattern 2121 may include at least one of a laser direct structuring (LDS) pattern provided on the dielectric structure 312a, a conductive plate attached to the outer surface of the dielectric structure 312a, or an FPCB including an antenna pattern. In some embodiments, the at least one conductive pattern 3121 may be disposed directly on the board 311. According to an embodiment, the socket module 313 may be fixed to the second board surface 3102 through an electrical connection process such as soldering, and may be finished by a bracket 314 made of a non-conductive material.

According to certain embodiments, the component assembly 310 may be disposed in the first space 2101 at a position at which the component assembly 310 does not overlap other electronic components, such as the main board 250 and the battery 251 when the first substrate surface 3101 is viewed from above. In some embodiments, the component assembly 310 may be disposed so as to at least partially overlap the main substrate 250 when the first board surface 3101 is viewed from above. In some embodiments, the component assembly 310 may be disposed to overlap the battery 251 when the first substrate surface 3101 is viewed from above. According to an embodiment, the board 311 of the component assembly 310 may be disposed in the first space 2101 of the first housing 210, and may be electrically connected to the main board 250 via the extension 3111 extending from the board 311. Accordingly, the antenna module 312 and the socket module 313 mounted on the board 311 may also be electrically connected to the main board 250.

FIG. 17 is a cross-sectional view of an electronic device according to certain embodiments taken along line 17-17 in FIG. 14.

Referring to FIG. 17, the electronic device 200 may include a component assembly 310 disposed in the first space 2101 of the first housing 210. According to an embodiment, the component assembly 310 may be disposed in the first space 2101 such that the antenna module 312 disposed on the board 311 faces the first rear cover 213 and the socket module 313 faces the battery 251. According to an embodiment, the socket module 313 may be disposed to be connected to the opening 212d provided in the stepped portion 212c of the first support member 212. Accordingly, while the electronic device 200 is in the slid-in state, the opening 212d is covered so as to be invisible from the outside through the second support member 222 of the second housing 220, which may be helpful for forming a beautiful appearance of the electronic device 200. According to an embodiment, while the electronic device 200 is in the slid-out state, the opening 212d is exposed so as to be visible from the outside. Thus, the opening 212d may serve as a space for inserting or removing at least one card device into or from the socket device 313.

Speaker Holes

Figure 18A:
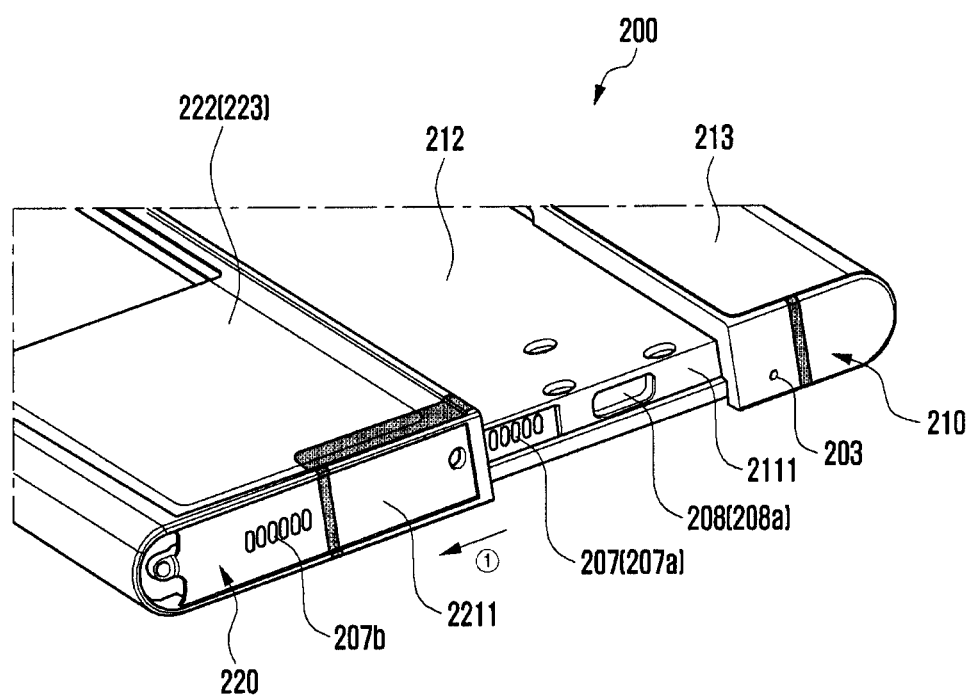
FIG. 18A is a perspective view illustrating a portion of an electronic device according to certain embodiments in the slid-out state.
Figure 18B:
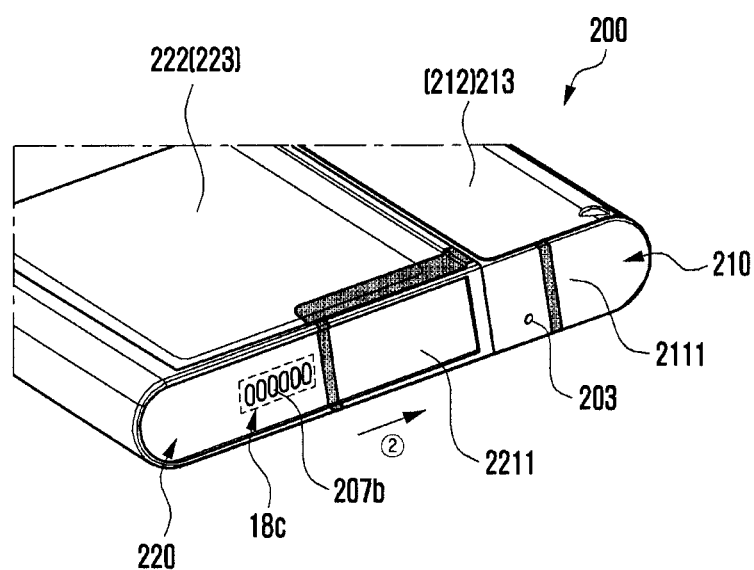
FIG. 18B is a perspective view illustrating a portion of an electronic device according to certain embodiments in the slid-in state.
Figure 18C:
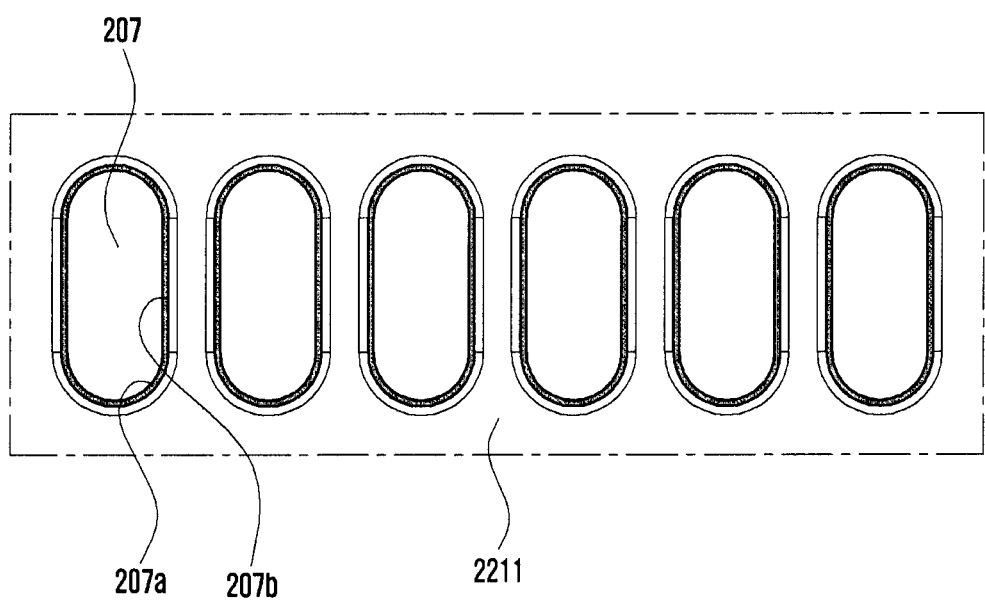
FIG. 18C is an enlarged view of the area 18c in FIG. 18B according to certain embodiments.

FIG. 18A is a perspective view illustrating a portion of an electronic device according to certain embodiments in the slid-out state, and FIG. 18B is a perspective view illustrating a portion of an electronic device according to certain embodiments in the slid-in state, and FIG. 18C is an enlarged view of the area 18c in FIG. 18B according to certain embodiments;

Referring to FIGS. 18A to 18C, the electronic device 200 may include a first housing 210 including a first side member (e.g., the first side member 211 in FIG. 2A) and a second side housing 220 coupled to the first housing 210 to be slid by a predetermined reciprocating distance and including a second side member (e.g., the second side member 221 in FIG. 2A). According to an embodiment, the electronic device 200 may include a speaker 207 disposed in the first space 2101 and configured to output sound through a first speaker hole 207a, which is an opening provided in the first side surface 2111 of the first side member 211 of the first housing 210, and a connector port 208 connected to the outside through a first connector port hole 208a, which is another opening provided in the first side surface 2111. According to an embodiment, the first speaker hole 207a and the first connector port hole 208a may be disposed so as to be visible from the outside through the first side surface 2111 in the slid-out state. According to one embodiment, in the slid-in state, the first speaker hole 207a and the first connector port hole 208a may be covered by at least a portion of the fourth side surface 2211 of the second side member 221 of the second housing 200. According to an embodiment, the second housing 220 may include a second speaker hole 207b, which is disposed at a corresponding position in the fourth side surface to correspond to the first speaker hole 207a in the first side surface 2111 in the slid-in state. According to an embodiment, the size of the second speaker hole 207b may be equal to or larger than the size of the first speaker hole 207a so as to prevent the sound performance of the speaker 207 from being deteriorated, which may be caused when the first speaker hole 207a is partially covered by the fourth side surface 2211 in the slid-in state. Accordingly, the speaker 207 disposed in the first space 2101 emits sound to the outside through the first speaker hole 207a and the second speaker hole 207b, even in the slid-in state, whereby the convenience of use of the electronic device can be improved. According to an embodiment, the first connector port hole 208a may be invisible from the outside by being covered by the fourth side surface 2211 in the slid-in state.

According to an exemplary embodiment, the electronic device 200 may include a sliding structure in which at least a portion of the flexible display (e.g., the flexible display 230 in FIG. 2) is accommodated in the second space of the second housing 220 (e.g., the second space 2201 in FIG. 17) according to a sliding operation, and the speaker 207 is disposed in the first space 2101 of the first housing 210, whereby the speaker 207 can be firmly fixed in the first space 2101 without considering the arrangement relationship with the flexible display 230. In addition, even in the slid-in state, it is possible to prevent performance degradation of the speaker by providing an external connection structure using the first speaker hole 207a in the first housing 210 and the second speaker hole 207b in the second housing 220 as openings.

Figure 19A:
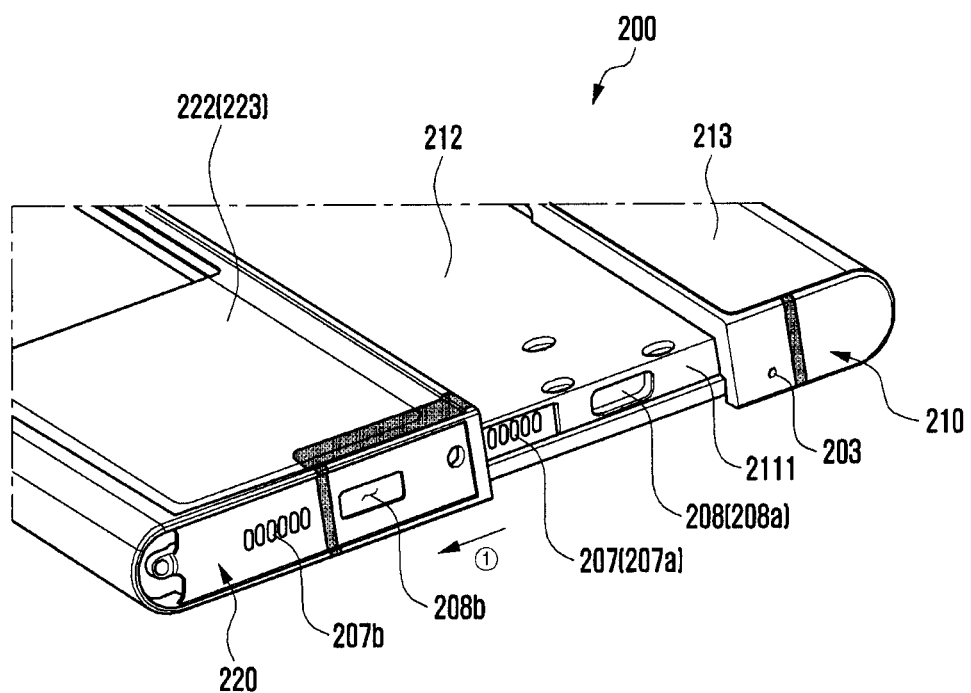
FIG. 19A is a perspective view illustrating a portion of an electronic device according to certain embodiments in the slid-out state.
Figure 19B:
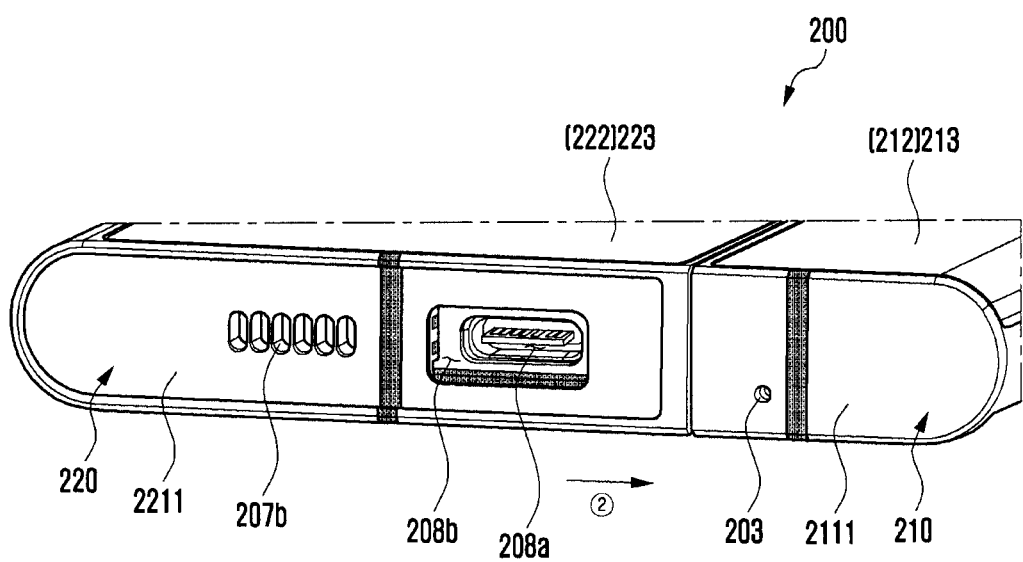
FIG. 19B is a perspective view illustrating a portion of an electronic device according to certain embodiments in the slid-in state.

FIG. 19A is a perspective view illustrating a portion of an electronic device according to certain embodiments in the slid-out state, and FIG. 19B is a perspective view illustrating a portion of an electronic device according to certain embodiments in the slid-in state.

Connector Port Hole

In describing the electronic device of FIGS. 19A and 19B, the components that are substantially the same as those of the electronic device of FIGS. 18A and 18B are denoted by the same referential numerals, and a detailed description thereof may be omitted.

Referring to FIGS. 19A and 19B, the electronic device 200 may include a second connector port hole 208b disposed in the fourth side surface 2211 of the second housing 220. According to an embodiment, the second connector port hole 208b may be disposed at a position corresponding to the first connector port hole 208a disposed in the first side surface 2111 of the first housing 210 while the electronic device is in the slid-in state. Accordingly, even in the slid-in state, the connector port 208 of the electronic device 200 is capable of accommodating a connector of an external device (e.g., a charging device) through the first connector port hole 208a and the second connector port hole 208b, which makes it possible to smoothly perform data transmission and/or charging operation. According to an embodiment, the second connector port hole 208b is larger than the first connector port hole 208a. Thus, a connector of an external device can be accommodated in the first connector port hole 208a through the second connector port hole 208b.

Figure 20A:
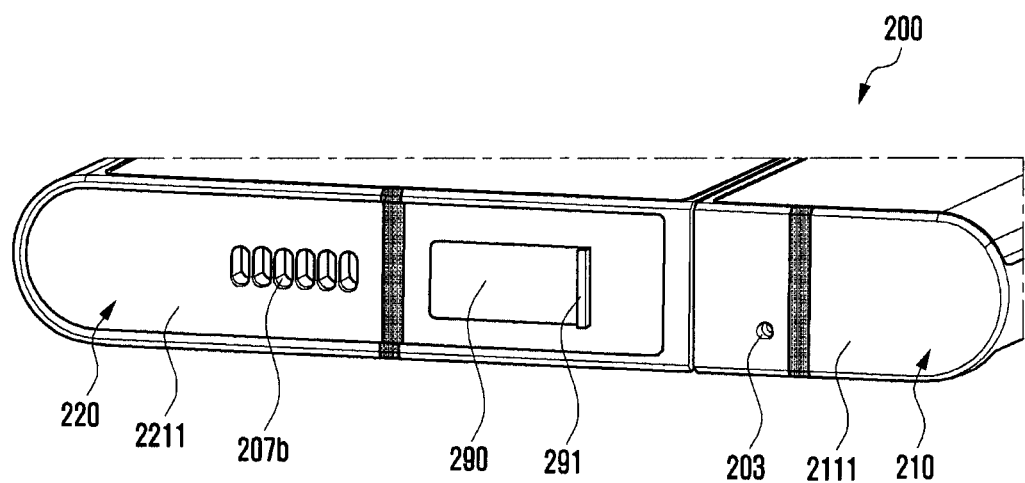
FIG. 20A is a perspective view illustrating a portion of an electronic device according to certain embodiments in the slid-out state.
Figure 20B:
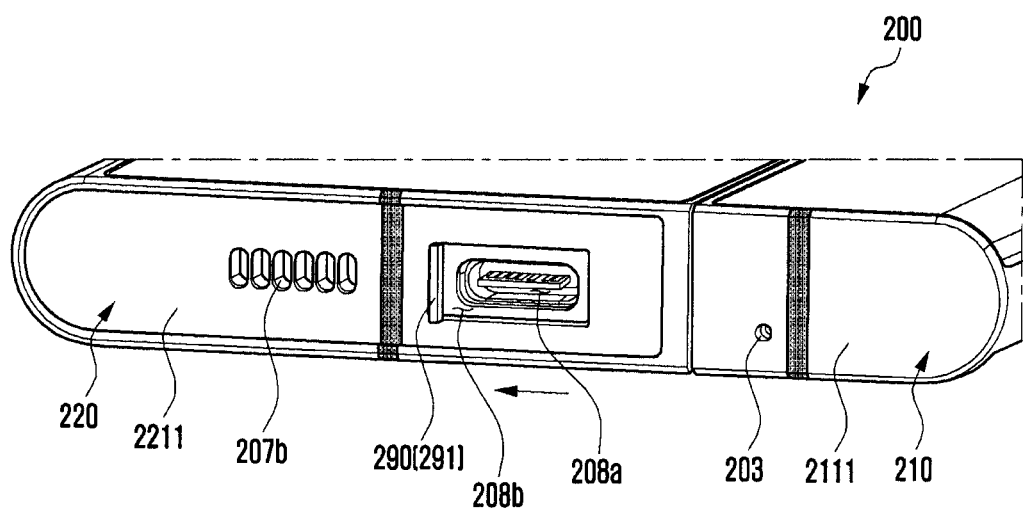
FIG. 20B is a perspective view illustrating a portion of an electronic device according to certain embodiments in the slid-in state.

FIG. 20A is a perspective view illustrating a portion of an electronic device according to certain embodiments in the slid-out state, and FIG. 20B is a perspective view illustrating a portion of an electronic device according to certain embodiments in the slid-in state.

In describing the electronic device of FIGS. 20A and 20B, the components that are substantially the same as those of the electronic device of FIGS. 19A and 19B are denoted by the same referential numerals, and a detailed description thereof may be omitted.

Referring to FIGS. 20A and 20B, the electronic device 200 may include a protective cover 290 disposed on the fourth side surface 2211 of the second housing 220 so as to seal the second connector port hole 208b in the slid-in state. According to an embodiment, the protective cover 290 may be disposed in the second housing 220 in a sliding manner so as to move to open or close the second connector port hole 208b. According to an embodiment, the protective cover 290 may include an operation unit 291 (e.g., a handle) protruding from one side thereof to the outside, thereby enhancing the convenience of operation. Accordingly, when the connector port 208 is not used, the second connector port hole 208b is maintained in the state of being closed by the protective cover 290, which makes it possible to prevent the introduction of foreign matter from the outside. In some embodiments, the protective cover 290 may be disposed to be removable from the second housing 220.

Conduit Structure

Figure 21A:
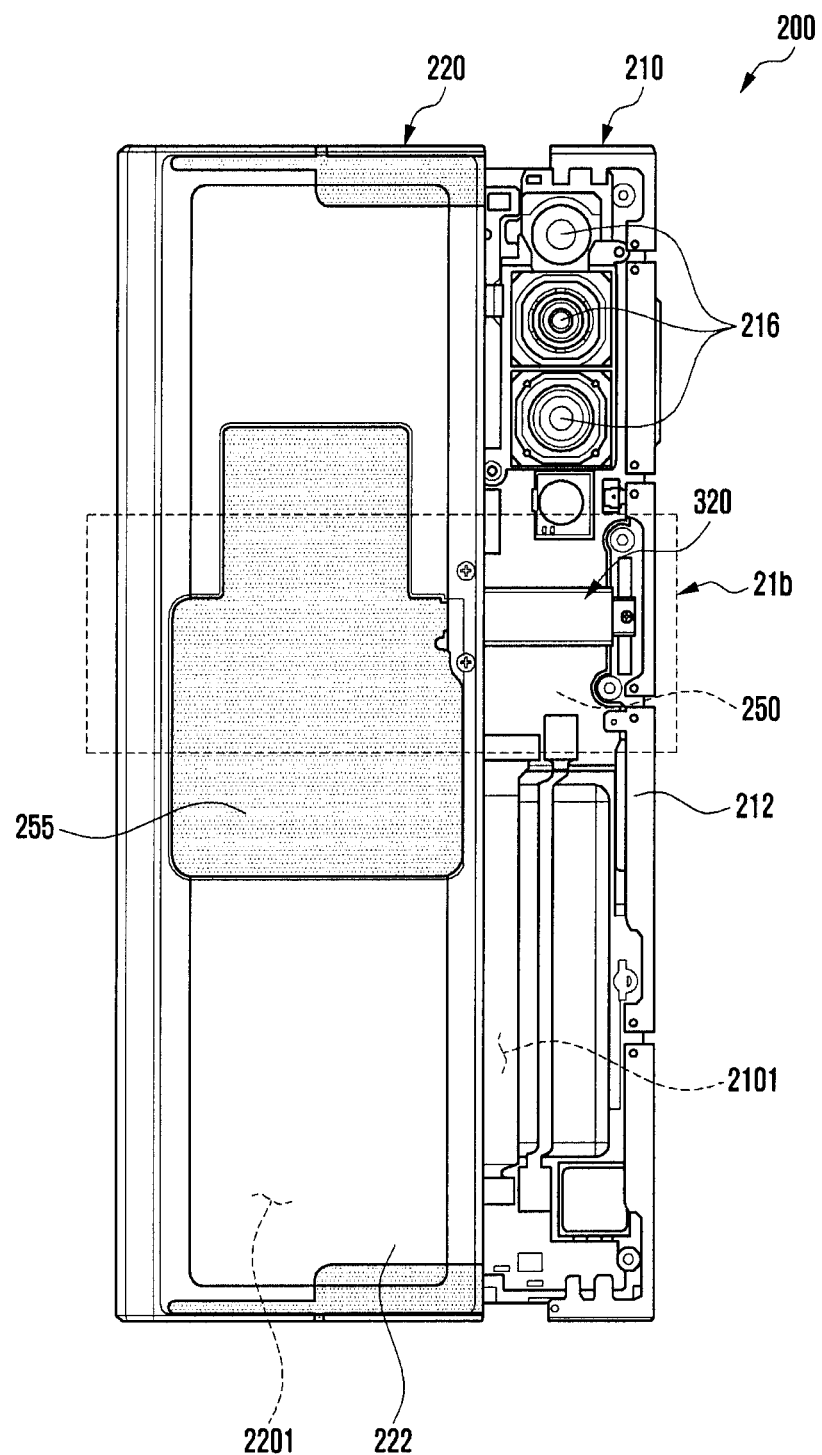
FIG. 21A is a view illustrating the configuration of an electronic device, in which an arrangement relationship between an electrical structure and a conduit structure is illustrated in the slid-in state according to certain embodiments.
Figure 21B:
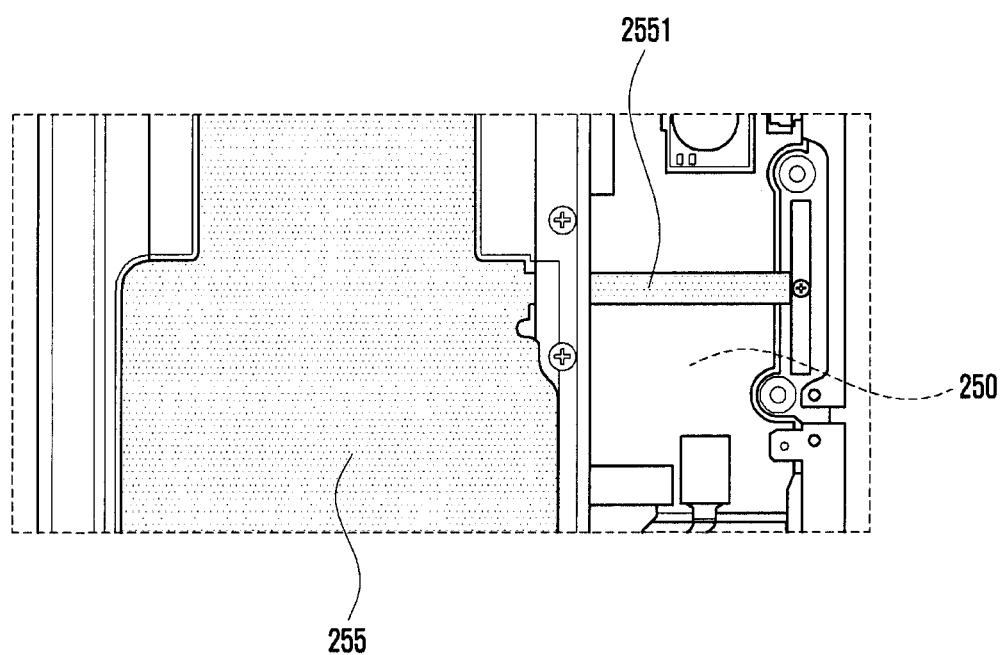
FIG. 21B is an enlarged view illustrating an arrangement relationship of a conductive member in the state in which a conduit structure is omitted in an area 21b of FIG. 21A according to certain embodiments.

FIG. 21A is a view illustrating the configuration of an electronic device, in which an arrangement relationship between an electrical structure and a conduit structure is illustrated in the slid-in state according to certain embodiments; FIG. 21B is an enlarged view illustrating an arrangement relationship of a conductive member in the state in which a conduit structure is omitted in an area 21b of FIG. 21A according to certain embodiments.

Figure 22A:
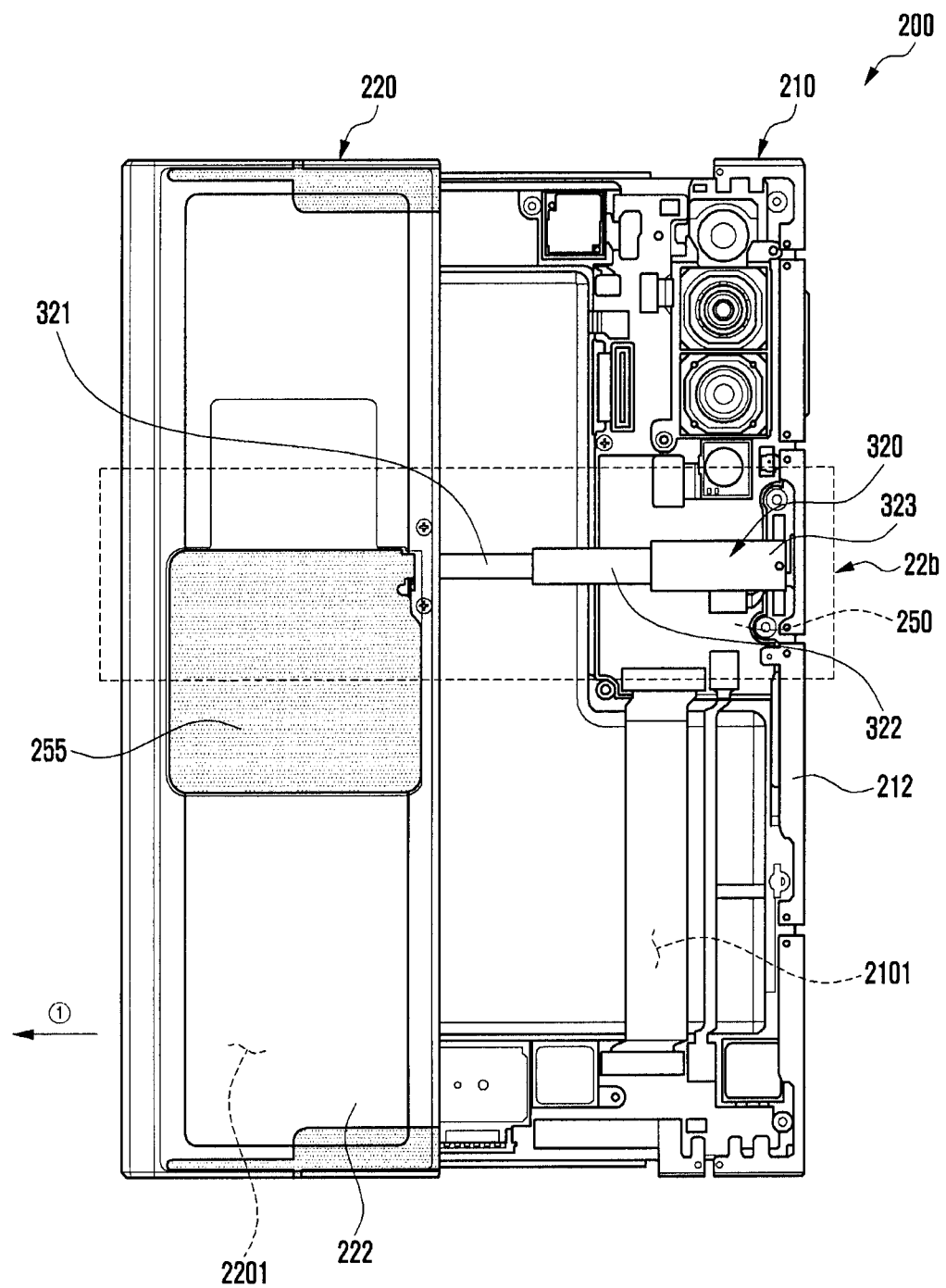
FIG. 22A is a view illustrating the configuration of an electronic device, in which an arrangement relationship between an electrical structure and a conduit structure is illustrated in the slid-out state according to certain embodiments.
Figure 22B:
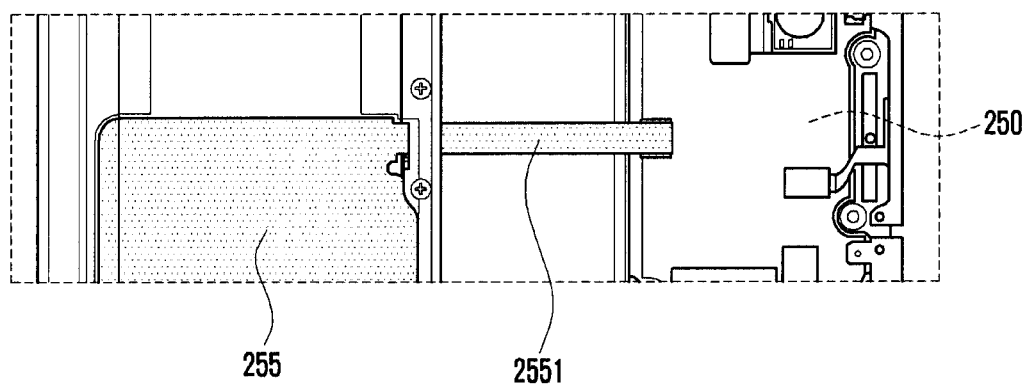
FIG. 22B is an enlarged view illustrating an arrangement relationship of a conductive member in the state in which a conduit structure is omitted in the area 22b of FIG. 22A according to certain embodiments.

FIG. 22A is a view illustrating the configuration of an electronic device, in which an arrangement relationship between an electrical structure and a conduit structure is illustrated in the slid-out state according to certain embodiments; FIG. 22B is an enlarged view illustrating an arrangement relationship of a conductive member in the state in which a conduit structure is omitted in the area 22b of FIG. 22A according to certain embodiments.

Referring to FIGS. 21A and 22B, the electronic device 200 may include a first housing 210 and a second housing 220 coupled to the first housing 210 to be slidable by a predetermined reciprocating distance. According to an embodiment, the electronic device 200 may include a main board 250 and at least one electronic component (e.g., a camera module 216), which are disposed in the first space 2101 of the first housing 210. According to an embodiment, the electronic device 200 may include an electrical structure 255 disposed in the second space 2201 of the second housing 220 and electrically connected to the main board 250 via a flexible printed circuit board (FPCB) 2551. According to an embodiment, the FPCB 2551 may extend from the electrical structure 255 of the second housing 220 to the first space 2101 of the first housing 210. According to an embodiment, the FPCB 2551 may be have a bendable shape so as to accommodate a sliding distance in which the second housing 220 is shifted from the slid-in state to the slid-out state. According to an embodiment, the electrical structure 255 may include an antenna disposed in the second housing 220. According to an embodiment, the electrical structure 255 may include an antenna for wireless power consortium (WPC), magnetic secure transmission (MST), or near field communication (NFC). In some embodiments, the electrical structure 255 may be disposed between the second support member 222 and the second rear cover (e.g., the second rear cover 223 in FIG. 3A) in the second housing 220.

According to certain embodiments, the electronic device 200 may include a sensing structure configured to detect the position of the second housing 220 during the slid-in state, the slid-out state, and/or the operating state of the second housing 220. According to an embodiment, as the sensing structure, the electronic device 200 may include an FPCB 2551 extending from the electrical structure 255 to the main board 250 and disposed in a curved shape, and a sensing member (e.g., the sensing member 256 in FIG. 23A) configured to detect contact with the second housing 220 varying according to the sliding operation of the FPCB 2551. According to an embodiment, the FPCB 2551 may include a conductive portion (e.g., a ground layer or a separate conductive pattern), and the sensing member 256 may include a touch sensor configured to detect the conductive portion of the FPCB 2551. In some embodiments, the sensing member 256 may have a sensing structure including multiple channels for detecting the conductive portion, rather than the touch sensor. According to an embodiment, the sensing member 256 may include multiple channels (e.g., 64 or more channels) configured to detect a change amount of a capacitance value that varies depending on a contact area that comes into contact with the conductive portion of the FPCB 2551. According to an embodiment, the sensing member 256 may be disposed in a manner in which multiple conductive channels are disposed on the main board 250. In some embodiments, the sensing member 256 may detect only a portion (e.g., an end) of the conductive portion of the FPCB 2551. In some embodiments, the sensing member 256 may be disposed separately from the main board 250, and may be electrically connected to the main board 250. According to an embodiment, the FPCB 2551 may be disposed to be at least partially in contact with the sensing member 256. For example, the FPCB 2551 may be formed in a "U" shape, in which one end of the FPCB 2551 may be electrically connected to the electrical structure 255 and the other end may be electrically connected to the main board 250. In some embodiments, the FPCB 2551 may extend integrally from electrical structure 255. According to an embodiment, at least a portion of the FPCB 2551 may be disposed to be substantially in contact with the sensing member 256. According to an embodiment, the FPCB 2551 may be arranged such that the contact of the sensing member 256 is variable according to the movement of the second housing 220. Accordingly, the FPCB 2551 may be disposed in the state of being curved in a "U" shape such that opposite ends thereof are oriented in the same first direction (direction ①).

According to certain embodiments, the electronic device 200 may include a protruding/receding conduit structure 320 disposed so as to induce the contact between the FPCB 2551 and the sensing member 256 to be uniformly changed according to the movement of the first housing 210 and to protect the sensing member 256. According to an embodiment, the conduit structure 320 may be coupled such that multiple conduits 321, 322, and 323, which are open at one sides thereof and have different sizes, protrude and recede with respect to each other. Accordingly, the length of the conduit structure 320 may be varied depending on whether the electronic device is in the slid-in state or in slid-out state. According to an embodiment, the conduit structure 320 may be disposed on the main board 250 in the first space 2101 of the first housing 210. According to an embodiment, the conduit structure 320 may include an internal space (e.g., the internal space 3201 in FIG. 24A) for accommodating the FPCB 2551, and may prevent the FPCB 2551 from being separated from the sensing member 256 during operation by being disposed to cover the sensing member 256. According to an embodiment, the conduit structure 320 may include a coupling structure for the conduits 321, 322, and 323, in which the coupling structure has an internal space (e.g., the internal space 3201 in FIG. 24A), the size of which gradually decreases in the first direction (direction ①). In some embodiments, the conduit structure 320 may include a coupling structure for the conduits, in which the conduit structure 320 has an internal space (e.g., the internal space 3201 in FIG. 24A), the size of which gradually decreases in a direction opposite to the first direction (direction ①). In some embodiments, the conduit structure 320 may include a coupling structure for the conduits, in which the coupling structure has an internal space (e.g., the internal space 3201 in FIG. 24A), the size of which is always constant regardless of protruding and receding of the conduits. According to an embodiment, the conduit structure 320 may include a first conduit 321 fixed to the second housing 220, a second conduit 322, which accommodates the first conduit 321 to be capable of protruding and receding, and a third conduit 323, which accommodates the second conduit 322 to be capable of protruding and receding and is fixed to the first housing 210. According to an embodiment, the first conduit 321 may be fixed to the second support member 222 of the second housing. According to an embodiment, the third conduit 323 may be fixed to the first support member 212 of the first housing 210. In some embodiments, the conduit structure 320 may have a coupling structure in which two conduits or four or more conduits are coupled to be capable of protruding and receding.

Figure 23A:
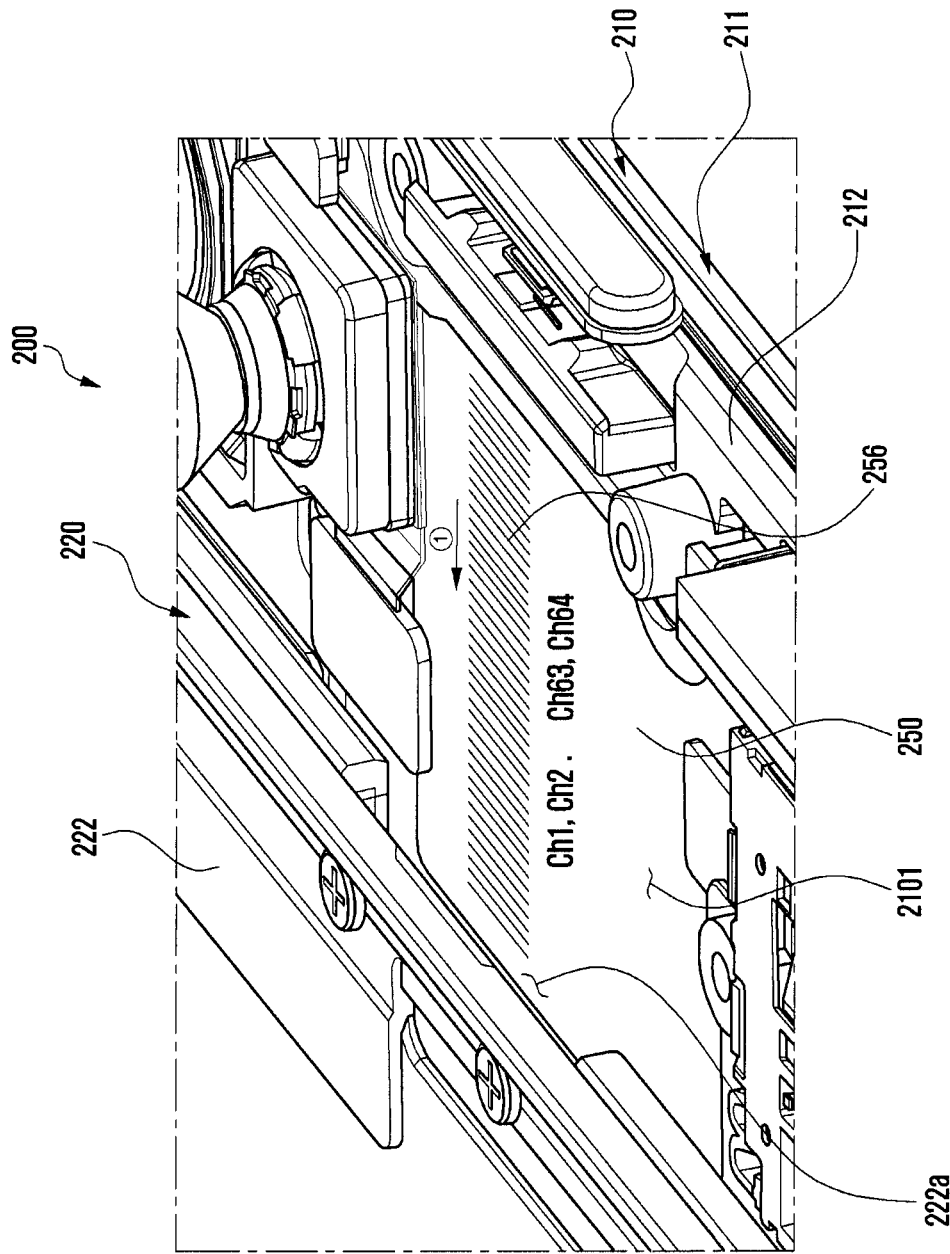
FIG. 23A is a perspective view illustrating a portion of an electronic device including a sensing member according to certain embodiments.
Figure 23B:
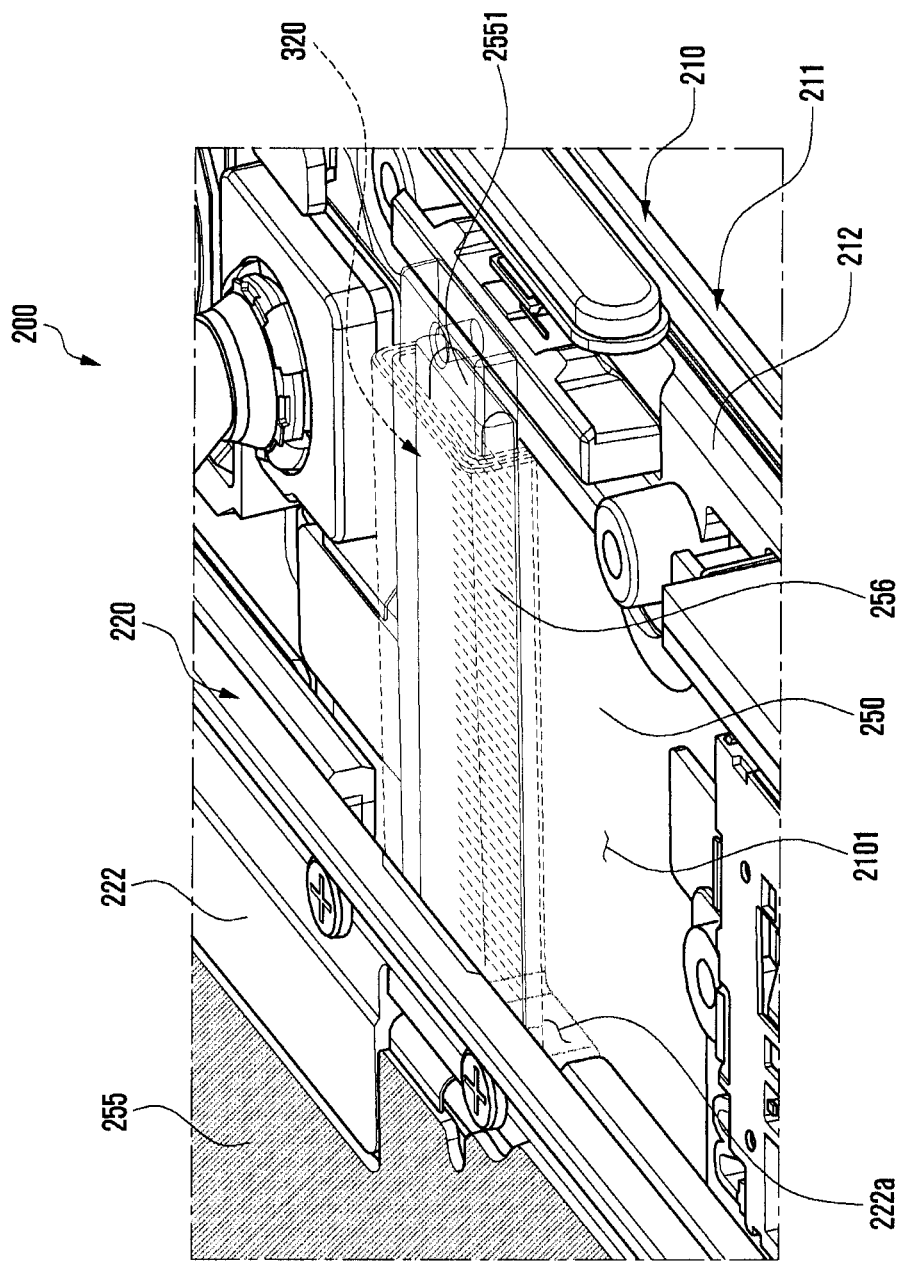
FIG. 23B is a perspective view illustrating a portion of an electronic device including a conduit structure according to certain embodiments.

FIG. 23A is a perspective view illustrating a portion of an electronic device including a sensing member according to certain embodiments. FIG. 23B is a perspective view illustrating a portion of an electronic device including a conduit structure according to certain embodiments.

Referring to FIGS. 23A and 23B, the electronic device 200 may include a main board 250 disposed in the first space 2101 of the first housing 210 and a sensing member 256 disposed on the main board 250. In some embodiments, the sensing member 256 may be disposed on another board (e.g., an FPCB) disposed separately from the main board 250 in the first space 2101 of the electronic device 200. For example, the sensing member 256 may include a sensor 256 (e.g., a touch sensor) including multiple channels each having a length for detecting a conductive portion of the FPCB 2551 that is substantially at least partially in contact therewith. According to an embodiment, the sensing member 256 has a capacitance that is changed when the conductive portion of the FPCB 2551 comes into surface contact, line contact, or point contact with the sensing member 256. According to an embodiment, the second housing 220 includes an opening portion 222a through which the FPCB 2551 is drawn out from the electrical structure 255 disposed in the second space 2201 to the first space 2101. According to an embodiment, the opening portion 222a may be formed by changing the shape of the second support member 222 of the second housing 220. According to an embodiment, the electronic device 200 may include a protruding/receding conduit structure 320 disposed in an area overlapping the sensing member 256 when the main board 250 is viewed from above, and configured to accommodate the FPCB 2551 in the internal space thereof (e.g., the internal space 3201 in FIG. 24A). Accordingly, the FPCB 2551 is disposed to be supported by the conduit structure 320, which may be helpful for preventing the FPCB 2551 from being separated from the sensing member 256 during operation.

Figure 24A:
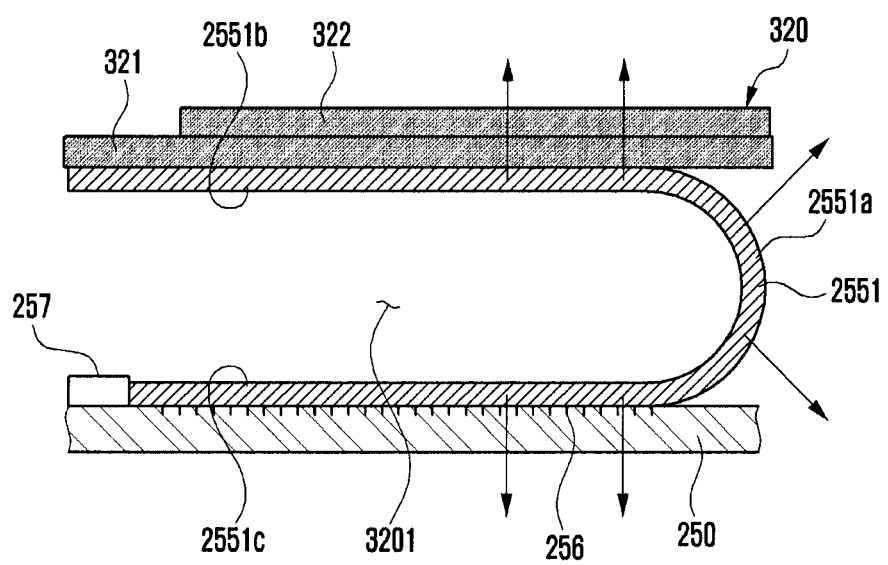
FIG. 24A is a view illustrating an arrangement relationship of a conductive member according to a protruding and receding operation of a conduit structure according to certain embodiments and FIG. 24B is a view illustrating an arrangement relationship of a conductive member according to a protruding and receding operation of a conduit structure according to certain embodiments.
Figure 24B:
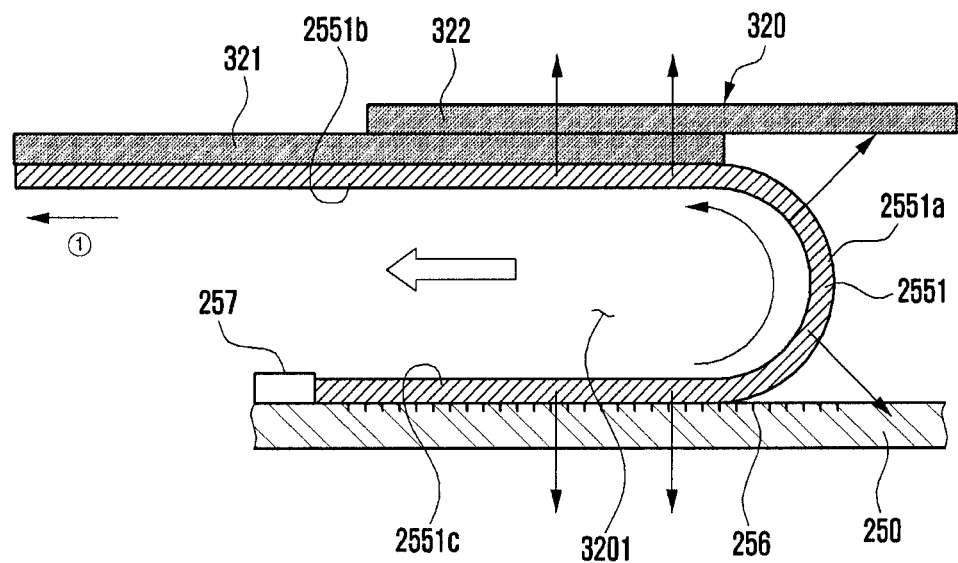

FIG. 24A is a view illustrating an arrangement relationship of a conductive member according to a protruding and receding operation of a conduit structure according to certain embodiments and FIG. 24B is a view illustrating an arrangement relationship of a conductive member according to a protruding and receding operation of a conduit structure according to certain embodiments.

Referring to FIGS. 24A and 24B, the FPCB 2551 may be disposed in the internal space 3201 of the conduit structure 320 to be at least partially in contact with the sensing member 256 of the main board 250. According to one embodiment, in the internal space 3201 of the conduit structure 320, with respect to a bent portion 2551a, one side portion 2551b of the FPCB 2551 may be in contact with the inner surface of the conduit structure 320, and the other side portion 2551c of the FPCB 2551 may be contact in contact with the sensing member 256 of the main board 250. Accordingly, the one side portion 2551b and the other side portion 2551c of the FPCB 2551 may be in tight contact with the inner wall of the conduit structure 320 and the outer surface of the main board 250 by the elastic force of the bent portion 2551a, which is to be unfolded. Through the tight contact structure of the FPCB 2551, the FPCB 2551 can be in contact with the main board 250, in which, when the one side portion 2551b of the FPCB 2551 is moved, the other side portion 2551 can also be moved by substantially the same amount. According to an embodiment, one end of the FPCB 2551 may be fixed to the main board 250 using a fixing member 257 (e.g., a connector).

According to certain embodiments, when the electronic device is shifted from the slid-in state (the state of FIG. 24A) to the slid-out state (the state of FIG. 24B), the one side portion 2551b of the FPCB 2551 connected to the electrical structure 255 disposed in the second housing 220 may be moved in the first direction (direction ①) along the inner surface of the conduit structure 320 by the protruding/receding operation structure of the conduits 321 and 322. At the same time, the contact of the other side portion 2551c of the FPCB 2551 with the sensor member 256 disposed on the main board 250 may be variable. For example, the sensing member 256 may detect a change in contact with the FPCB 2551 so as to determine the slid-out state of the electronic device 200. In some embodiments, while the electronic device 200 is being shifted from the slid-in state to the slid-out state, the sensing member 256 may detect the sliding position of the second housing 220 in real time.

According to certain embodiments, the electronic device 200 may include at least one processor (e.g., the processor 120 in FIG. 1) operatively connected to the sensing member 256 and the flexible display (e.g., the flexible display 230 in FIG. 2A). According to an embodiment, the at least one processor 120 may determine the slid-in state, the slid-out state, or a state during the shifting operation of the electronic device 200 using a sensing member 256, which detects contact with the FPCB 2551. According to an embodiment, the at least one processor 120 may detect the current display area of the flexible display 230 using the sensing member 256, which detects contact with the FPCB 2551, and may control the flexible display 230 to display at least one object in the current display area. According to an embodiment, the at least one processor 120 may control at least one application using the sensing member 256, which detects contact with the FPCB 2551. According to an embodiment, the at least one application may include a program related to sound input/output through a speaker and/or a microphone and/or a program related to tactile output through a vibration motor.

Figure 25A:
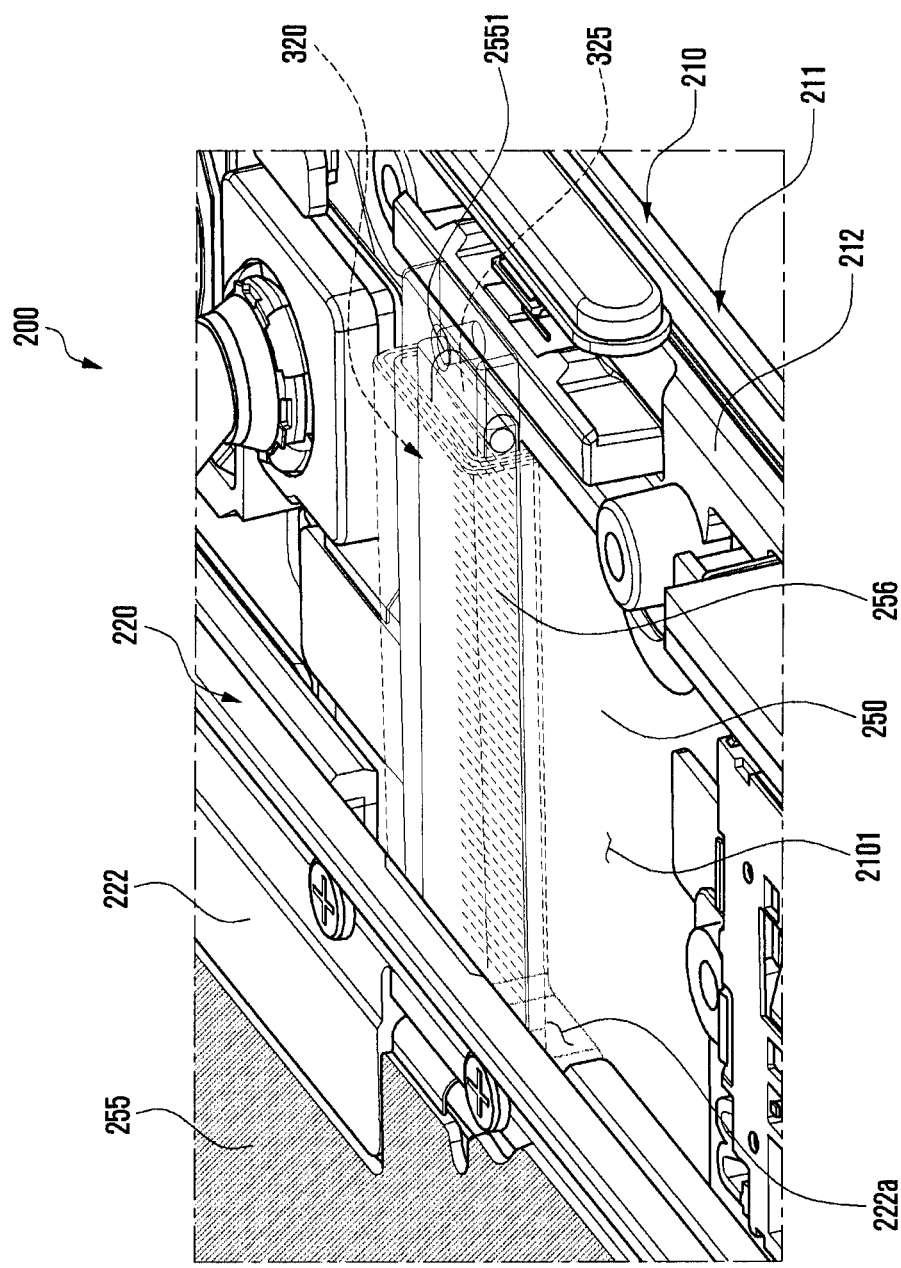
FIG. 25A is a perspective view illustrating a portion of an electronic device including a conduit structure according to certain embodiments.
Figure 25B:
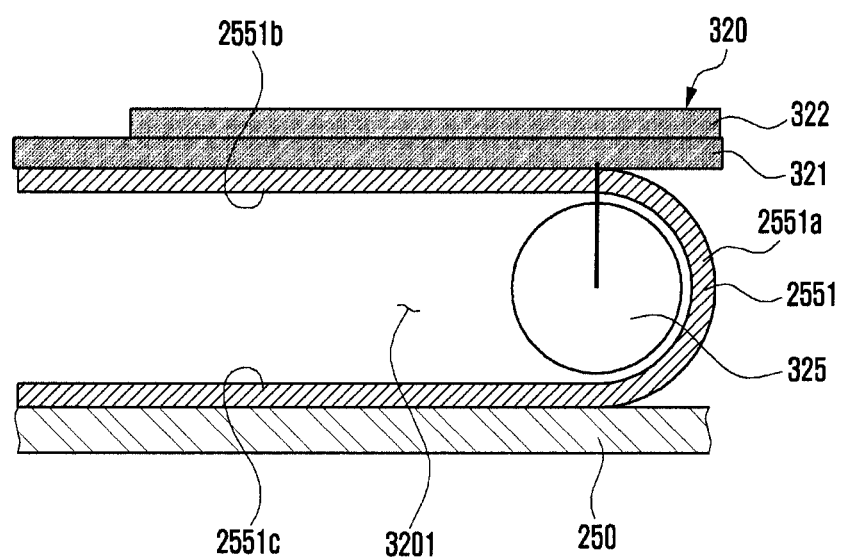
FIG. 25B is a view illustrating an arrangement relationship of a conductive member according to a protruding and receding operation of a conduit structure including a support roller according to certain embodiments.

FIG. 25A is a perspective view illustrating a portion of an electronic device including a conduit structure according to certain embodiments. FIG. 25B is a view illustrating an arrangement relationship of a conductive member according to a protruding and receding operation of a conduit structure including a support roller according to certain embodiments, and FIG. 25C is a view illustrating an arrangement relationship of a conductive member according to a protruding and receding operation of a conduit structure including a support roller according to certain embodiments.

Figure 25C:
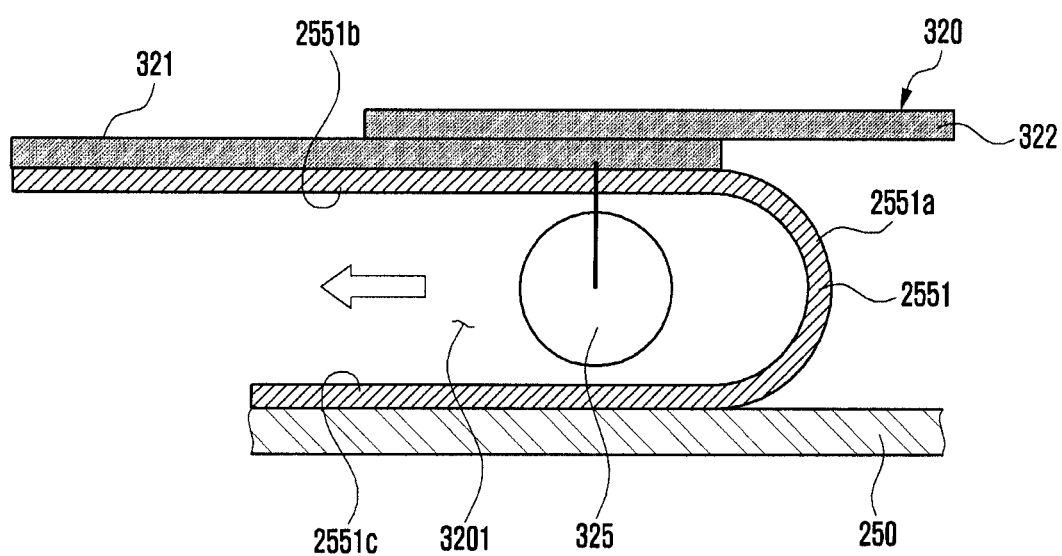
FIG. 25C is a view illustrating an arrangement relationship of a conductive member according to a protruding and receding operation of a conduit structure including a support roller according to certain embodiments.

In describing the sensing structure of FIGS. 25A to 25C, the components that are substantially the same as those of the sensing structure of FIGS. 24A and 24B are denoted by the same referential numerals, and a detailed description thereof may be omitted.

Referring to FIGS. 25A to 25C, the sensing structure may include a support roller 325 disposed in the internal space 3201 of the conduit structure 320. According to an embodiment, the support roller 325 may be disposed between the bent portion 2551a and the one side portion 2551b and the other side portion 2551c of the FPCB 2551. According to an embodiment, the support roller 325 continuously supports the bent portion 2551a of the FPCB 2551 in the internal space of the conduit 321 fixed to the second housing 220 among the multiple pipes 321 and 322 such that the movement amount of the FPCB 2551 is substantially the same as the movement amount of the second housing 220, which may be helpful for inducing a high sensing resolution.

Figure 26A:
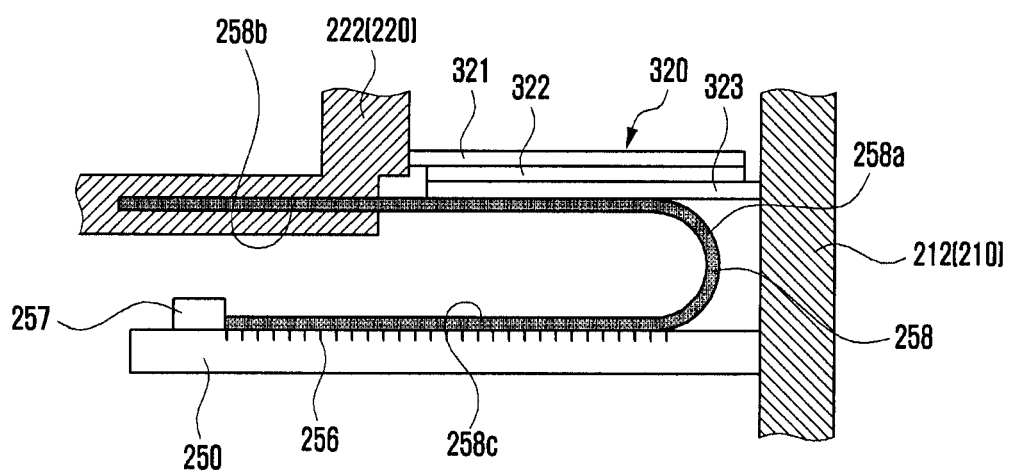
FIG. 26A is a view illustrating an arrangement member of a conductive member when an electronic device is in the slid-in state according to certain embodiments.
Figure 26B:
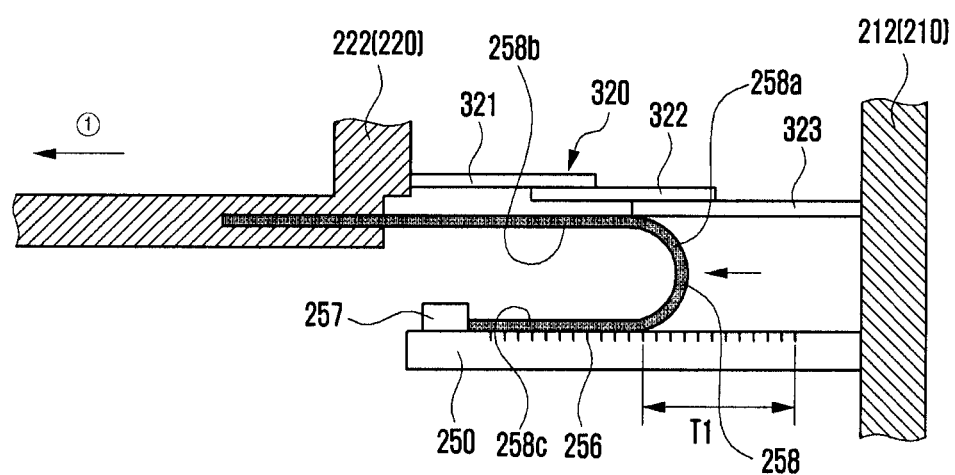
FIG. 26B is a view illustrating an arrangement relationship of a conductive member when an electronic device is in the slid-out state.

FIG. 26A is a view illustrating an arrangement member of a conductive member when an electronic device is in the slid-in state according to certain embodiments, and FIG. 26B is a view illustrating an arrangement relationship of a conductive member when an electronic device is in the slid-out state.

In describing the sensing structure of FIGS. 26A and 26B, the components that are substantially the same as those of the sensing structure of FIGS. 24A and 24B are denoted by the same referential numerals, and a detailed description thereof may be omitted.

Referring to FIGS. 26A and 26B, as a member to be detected that is detected by the sensing member 256, the FPCB 2551 may be replaced by a separately disposed conductive member 258. According to an embodiment, the conductive member 258 may include an elastic metal plate or a conductive film. Accordingly, in the state of being bent in a "U" shape, one end of the conductive member 258 may be fixed to the second support member 222 of the second housing 220, and the other end may be fixed to the fixing portion 257 of the main board 250. According to an embodiment, in the internal space 3201 of the conduit structure 320 including the multiple conduit lines 321, 322, and 323, which are coupled to be capable of protruding and receding, with reference to the bend portion 258a, one side portion 258b of the conductive member 258 may be in contact with the inner surface of the conduit structure, and the other side portion 258c of the conductive member 258 may be in contact with the sensing member 256 of the main board. Accordingly, the one side portion 258b and the other side portion 258b of the conductive member may be in tight contact with the inner wall of the conduit structure 320 and the outer surface of the main board 250 by the elastic force of the bent portion 258a, which is to be unfolded, and may be moved by a predetermined reciprocating distance T1 while being in contact with the sensing member 256.

According to exemplary embodiments, since the electronic device includes a first housing and a second housing disposed so as to be slidable in a predetermined direction from the first housing, and electronic components are disposed in the internal space of the first housing so as to face the outside through an opening formed in the first housing, it is possible to firmly support the electronic components regardless of the arrangement structure of the flexible display. In addition, the electronic components are covered so as to be invisible from the outside through the second housing in the slid-in state, which is helpful for improving the aesthetics of the electronic device.

According to certain embodiments, an electronic device comprises a first housing including a first space; a second housing slidably coupled to the first housing to slide in a first direction in a slid-out state and retract in a second direction opposite the first direction in a slid-in state, the second housing and including a second space; a bendable member connected to the first housing and at least partially accommodated in the second space in the slid-in state and having at least a portion configured to form a substantially same plane as a surface of the first housing in the slid-out state; a flexible display including a first portion disposed so as to be visible from an outside of the electronic device in the slid-in state and a second portion extending from the first portion accommodated in the second space; and at least one electronic component disposed in the first space and exposed to the outside of the electronic device through a first hole in the first housing, wherein the first hole is disposed to overlap at least a portion of the second housing in the slid-in state and is exposed to the outside in the slid-out state.

According to certain embodiments, the second portion is exposed to the outside of the electronic device while being supported by at least the portion of the bendable member in the slid-out state.

According to certain embodiments, the first housing includes a first side member forming a portion of an exterior of the electronic device, the second housing includes a second side member forming at least another portion of the exterior of the electronic device, and wherein at least a portion of the first side member is covered by the second side member in the slid-in state.

According to certain embodiments, the first side member includes the first hole, and the second side member includes a second hole located at a position at least partially corresponding to the first hole in the slid-in state.

According to certain embodiments, the second hole has a substantially same size as the first hole.

According to certain embodiments, the second hole is larger than the first hole.

According to certain embodiments, the electronic device further comprises a protective cover disposed in the second hole configured to selectively cover the second hole.

According to certain embodiments, the first side member includes a first side surface, a second side surface extending from the first side surface in a direction substantially perpendicular to the first direction, and a third side surface extending from the second side surface in a direction substantially parallel to the first side surface, and the second side member includes a fourth side surface facing at least a portion of the first side surface, a fifth side surface extending from the fourth side surface and disposed substantially parallel to the second side surface, and a sixth side surface extending from the fifth side surface and facing at least a portion of the third side surface.

According to certain embodiments, at least the portion of the first side surface includes an overlapping area covered by at least the portion of a fourth side surface in the slid-in state.

According to certain embodiments, the first hole includes at least one of a speaker hole, a microphone hole, or an IF connector port hole formed in the overlapping area of the first side surface.

According to certain embodiments, the electronic component includes at least one of a speaker module, a microphone module, a sensor module, a socket module, or an IF connector port.

According to certain embodiments, the at least one electronic component is provided as a single component assembly in which a first electronic component and a second electronic component are arranged.

According to certain embodiments, the component assembly includes a board including a first board surface and a second board surface facing away from the first board surface, the board being connected to a main board (PCB) of the electronic device; the first electronic component disposed on the first board surface; and the second electronic component disposed on the second board surface, wherein the first electronic component and the second electronic component are electrically connected to the main board via the board.

According to certain embodiments, the first hole is located at a position corresponding to the second electronic component.

According to certain embodiments, the first electronic component includes a dielectric structure and at least one conductive pattern disposed on the dielectric structure, wherein the conductive pattern is set to transmit and/or receive a wireless signal in a predetermined frequency band via a wireless communication circuit disposed in the first space.

According to certain embodiments, the second electronic component includes a socket module configured to accommodate an external card.

According to certain embodiments, the first housing includes a first side member forming at least a portion of an exterior of the electronic device and a first support member extending from the first side member into the first space, the second housing includes a second side member forming at least a another portion of the exterior of the electronic device and a second support member extending from the second side member into the second space, and the first support member includes a non-overlapping portion exposed to the outside without overlapping the second support member in the slid-in state, and an overlapping portion extending from the non-overlapping portion and overlapping the second support member.

According to certain embodiments, the first support member includes a stepped portion disposed between the non-overlapping portion and the overlapping portion and covered by the second support member in the slid-in state, wherein the stepped portion includes the first hole.

According to certain embodiments, the first space includes a first sub-space corresponding to the non-overlapping portion and having a first size, and a second sub-space connected to the first sub-space, having a second size that is smaller than the first size, and corresponding to the overlapping portion.

According to certain embodiments, the at least one electronic component is disposed in the second sub-space and connected to the outside through the first hole located in the stepped portion.

What is claimed is:

1. An electronic device comprising:
   a first housing including a first space;
   a second housing slidably coupled to the first housing to slide in a first direction in a slid-out state and retract in a second direction opposite the first direction in a slid-in state, the second housing and including a second space;
   a bendable member connected to the first housing and at least partially accommodated in the second space in the slid-in state and having at least a portion configured to form a substantially same plane as a surface of the first housing in the slid-out state;
   a flexible display including a first portion disposed so as to be visible from an outside of the electronic device in the slid-in state and a second portion extending from the first portion accommodated in the second space; and
   at least one electronic component disposed in the first space and exposed to the outside of the electronic device through a first hole in the first housing,
   wherein the first hole is disposed to overlap at least a portion of the second housing in the slid-in state and is exposed to the outside in the slid-out state.

2. The electronic device of claim 1, wherein the second portion is exposed to the outside of the electronic device while being supported by at least the portion of the bendable member in the slid-out state.

3. The electronic device of claim 1, wherein the first housing includes a first side member forming a portion of an exterior of the electronic device,
   the second housing includes a second side member forming at least another portion of the exterior of the electronic device, and
   wherein at least a portion of the first side member is covered by the second side member in the slid-in state.

4. The electronic device of claim 3, wherein the first side member includes the first hole, and
   the second side member includes a second hole located at a position at least partially corresponding to the first hole in the slid-in state.

5. The electronic device of claim 4, wherein the second hole has a substantially same size as the first hole.

6. The electronic device of claim 4, wherein the second hole is larger than the first hole.

7. The electronic device of claim 4, further comprising:
   a protective cover disposed in the second hole configured to selectively cover the second hole.

8. The electronic device of claim 3, wherein the first side member includes a first side surface, a second side surface extending from the first side surface in a direction substantially perpendicular to the first direction, and a third side surface extending from the second side surface in a direction substantially parallel to the first side surface, and
   the second side member includes a fourth side surface facing at least a portion of the first side surface, a fifth side surface extending from the fourth side surface and disposed substantially parallel to the second side surface, and a sixth side surface extending from the fifth side surface and facing at least a portion of the third side surface.

9. The electronic device of claim 8, wherein at least the portion of the first side surface includes an overlapping area covered by at least the portion of a fourth side surface in the slid-in state.

10. The electronic device of claim 9, wherein the first hole includes at least one of a speaker hole, a microphone hole, or an IF connector port hole formed in the overlapping area of the first side surface.

11. The electronic device of claim 1, wherein the electronic component includes at least one of a speaker module, a microphone module, a sensor module, a socket module, or an IF connector port.

12. The electronic device of claim 1, wherein the at least one electronic component is provided as a single component assembly in which a first electronic component and a second electronic component are arranged.

13. The electronic device of claim 12, wherein the component assembly includes:
   a board including a first board surface and a second board surface facing away from the first board surface, the board being connected to a main board (PCB) of the electronic device;
   the first electronic component disposed on the first board surface; and
   the second electronic component disposed on the second board surface,
   wherein the first electronic component and the second electronic component are electrically connected to the main board via the board.

14. The electronic device of claim 13, wherein the first hole is located at a position corresponding to the second electronic component.

15. The electronic device of claim 13, wherein the first electronic component includes:
   a dielectric structure; and
   at least one conductive pattern disposed on the dielectric structure,
   wherein the conductive pattern is set to transmit and/or receive a wireless signal in a predetermined frequency band via a wireless communication circuit disposed in the first space.

16. The electronic device of claim 13, wherein the second electronic component includes a socket module configured to accommodate an external card.

17. The electronic device of claim 1, wherein the first housing includes a first side member forming at least a portion of an exterior of the electronic device and a first support member extending from the first side member into the first space,
   the second housing includes a second side member forming at least a another portion of the exterior of the electronic device and a second support member extending from the second side member into the second space, and
   the first support member includes a non-overlapping portion exposed to the outside without overlapping the second support member in the slid-in state, and an overlapping portion extending from the non-overlapping portion and overlapping the second support member.

18. The electronic device of claim 17, wherein the first support member includes a stepped portion disposed between the non-overlapping portion and the overlapping portion and covered by the second support member in the slid-in state, wherein the stepped portion includes the first hole.

19. The electronic device of claim 18, wherein the first space includes a first sub-space corresponding to the non-overlapping portion and having a first size, and a second sub-space connected to the first sub-space, having a second size that is smaller than the first size, and corresponding to the overlapping portion.

20. The electronic device of claim 19, wherein the at least one electronic component is disposed in the second sub-space and connected to the outside through the first hole located in the stepped portion.

* * * * *